(12) United States Patent
Inada et al.

(10) Patent No.: US 9,607,357 B2
(45) Date of Patent: Mar. 28, 2017

(54) IMAGE PROCESSING DEVICE FOR DISPLAYING MOVING IMAGE AND IMAGE PROCESSING METHOD THEREOF

(71) Applicant: Sony Computer Entertainment Inc., Tokyo (JP)

(72) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 14/940,527

(22) Filed: Nov. 13, 2015

(65) Prior Publication Data

US 2016/0071235 A1    Mar. 10, 2016

Related U.S. Application Data

(63) Continuation of application No. 13/782,185, filed on Mar. 1, 2013, now Pat. No. 9,218,640, which is a (Continued)

(30) Foreign Application Priority Data

Sep. 13, 2010 (JP) ................................. 2010-204805
Sep. 13, 2010 (JP) ................................. 2010-204806

(51) Int. Cl.
*H04N 19/176* (2014.01)
*G06T 1/60* (2006.01)
(Continued)

(52) U.S. Cl.
CPC ................ *G06T 1/60* (2013.01); *G06F 3/011* (2013.01); *H04N 19/119* (2014.11);
(Continued)

(58) Field of Classification Search
CPC ...... H04N 19/176; H04N 19/59; H04N 19/96; H04N 19/119; H04N 19/186; H04N 19/33; G06F 3/011; G06T 1/60
See application file for complete search history.

(56) References Cited

U.S. PATENT DOCUMENTS 6,535,232 B1    3/2003  Tsuda
6,563,999 B1    5/2003  Suzuoki
(Continued)

FOREIGN PATENT DOCUMENTS

CN    1189955 A    8/1998
CN    1258366 A    6/2000
(Continued)

OTHER PUBLICATIONS

International Search Report for the corresponding PCT Application No. PCT/JP2011/003871, dated Sep. 27, 2011.
(Continued)

*Primary Examiner* — Alexander Eisen
*Assistant Examiner* — Abhishek Sarma
(74) *Attorney, Agent, or Firm* — Matthew B. Dernier, Esq.

(57) ABSTRACT

Methods and Apparatus provide for obtaining a data sequence representative of a three-dimensional parameter space; forming a plurality of coding units by dividing, in three dimensions, the data sequence subject; and generating, for each of the plurality of coding units: (i) a palette defined by two representative values, and (ii) a plurality of indices, each index representing a respective original data point as a value, determined by linear interpolation, to be one of, or an intermediate value between, the representative values, and setting the palette and the plurality of indices for each of the coding units as compressed data.

18 Claims, 14 Drawing Sheets

Related U.S. Application Data continuation of application No. PCT/JP2011/003871, filed on Jul. 6, 2011.

(51) Int. Cl.

| | | |
|---|---|---|
| *H04N 19/119* | (2014.01) | |
| *G06F 3/01* | (2006.01) | |
| *H04N 19/59* | (2014.01) | |
| *H04N 19/33* | (2014.01) | |
| *H04N 19/186* | (2014.01) | |
| *H04N 19/96* | (2014.01) | |

(52) U.S. Cl.
CPC ......... *H04N 19/176* (2014.11); *H04N 19/186* (2014.11); *H04N 19/33* (2014.11); *H04N 19/59* (2014.11); *H04N 19/96* (2014.11)

(56) References Cited

U.S. PATENT DOCUMENTS

| | | | | |
|---|---|---|---|---|
| 2004/0151372 | A1* | 8/2004 | Reshetov | G06T 9/005 382/166 |
| 2006/0098215 | A1* | 5/2006 | Enokida | H04N 19/70 358/1.2 |
| 2008/0002895 | A1* | 1/2008 | Flavell | G06T 9/005 382/232 |
| 2009/0067737 | A1 | 3/2009 | Takahashi | |
| 2009/0110305 | A1* | 4/2009 | Fenney | G06T 9/005 382/232 |
| 2010/0067790 | A1* | 3/2010 | Yamamoto | H04N 1/644 382/166 |

FOREIGN PATENT DOCUMENTS

| | | |
|---|---|---|
| JP | 11265461 A | 9/1999 |
| JP | 2003317110 A | 11/2003 |
| JP | 2003348562 A | 12/2003 |
| JP | 2004234476 A | 8/2004 |
| JP | 2009065421 A | 3/2009 |
| WO | 2005059836 A1 | 6/2005 |
| WO | 2006006915 A1 | 1/2006 |

OTHER PUBLICATIONS

International Preliminary Report n Patentability for the corresponding PCT Application No. PCT/JP2011/003871, dated Apr. 9, 2013.
Office Action for corresponding Japanese Patent Application No. 2010-204806, dated Oct. 22, 2013.
European Search Report for corresponding European Patent Application No. 11824711, dated Mar. 19, 2014.
F-O Devaux et al; "Remote Interactive Browsing of Video Surveillance Content Based on JPEG 2000", IEEE Transactions on Circuits and Systems for Video Technology, IEEE Service Center, Piscataway, NJ, US, vol. 19, No. 8, pp. 1143-1157, Aug. 1, 2009.
Aditya Mavlankar et al; "Optimal slice size for streaming regions of high resolution video with virtual pan/tilt/zoom functionality", Proc. of 15th European Signal Processing Conference (EUSIPCO), pp. 1-5, Sep. 30, 2007.
Aditya Mavlankar et al; "Optimal server bandwidth allocation for streaming multiple streams via P2P multicast" Multimedia Signal Processing, 2008 IEEE 10th Workshop on, IEEE, Piscataway, NJ, USA, pp. 468-473, Oct. 8, 2008.
Aditya Mavlankar et al; "Region-of-interest prediction for interactively streaming regions of high resolution video" Packet Video 2007, IEEE, pp. 68-77, Nov. 1, 2007.
Mavlankar Aditya et al; "Background extraction and long-term memory motion-compensated prediction for spatial-random-access-enabled video coding ÂÃ", Picture Coding Symposium 2009; Jun. 5, 2009 Aug. 5, 2009; Chicago, pp. 1-4, May 6, 2009.
Office Action for corresponding Chinese Patent Application No. 201180043291.7 dated Jun. 3, 2015.
Office action for corresponding U.S. Appl. No. 13/782,185, dated Oct. 29, 2014.
Office action for corresponding U.S. Appl. No. 13/782,185, dated May 7, 2015.

\* cited by examiner

IMAGE PROCESSING DEVICE FOR DISPLAYING MOVING IMAGE AND IMAGE PROCESSING METHOD THEREOF

CROSS REFERENCE TO RELATED APPLICATIONS

This is a continuation application of U.S. patent application Ser. No. 13/782,185, accorded a filing date of Mar. 1, 2013, which is a continuation application of International Application No. PCT/JP2011/003871, filed Jul. 6, 2011, the entire disclosures of which are hereby incorporated by reference.

BACKGROUND OF THE INVENTION

1. Field of the Invention

The present invention relates to an image processing device and an image processing method for displaying moving images and an information processing device and an information processing method for coding and decoding three-dimensional data such as moving images.

2. Description of the Related Art

Home entertainment systems are proposed that are capable of reproducing moving images as well as running game programs. In home entertainment systems, a GPU generates three-dimensional images using polygons (see, e.g., U.S. Pat. No. 6,563,999).

Regardless of whether an image is a moving image or still image, improvement in efficiency of displaying the image is an important and constant challenge. Therefore, various technologies have been developed and put into a practical use in many ways such as a compression technology, a transmission technology, an image processing technology, and a display technology of image data, allowing high-definition images to be enjoyed in various scenes in a familiar manner.

There is always a demand for displaying high-definition images with good responsiveness in accordance with user requests. For example, in order to realize image display that offers freedom with respect to user's point of view such as enlarging an area of user's interest in the entire image being displayed or moving the area to another area, with good responsiveness, it is necessary to allow for random access while processing large-size image data in a short period of time. Thus, there is a need for further progress of technologies.

Related Art List: U.S. Pat. No. 6,563,999

SUMMARY OF THE INVENTION

In this background, a purpose of the present invention is to provide an image processing technology capable of displaying high-definition moving images with good responsiveness with respect to user operation input for a display area. Another purpose is to provide an information processing technology capable of outputting three-dimensional data such as moving images with good responsiveness to various demands.

One embodiment of the present invention relates to an image processing device. The image processing device comprises: a moving image data memory unit configured to store hierarchical moving image data obtained by hierarchizing, in order of resolution, a plurality of image frame sequences that represent image frames constituting a single moving image in different resolutions; an input information acquisition unit configured to sequentially acquire user operation input information related to a display area; and a display image processing unit configured to generate a moving image to be displayed on a display device by using the hierarchical moving image data, while changing an area of the moving image to be displayed in accordance with the operation input information acquired by the input information acquisition unit, wherein the display image processing unit switches a hierarchical layer, used to generate a moving image in the hierarchical moving image data, in accordance with a change in resolution determined by the operation input information.

Another embodiment of the present invention relates to an image processing method. The image processing method comprises: reading out hierarchical moving image data obtained by hierarchizing, in order of resolution, a plurality of image frame sequences that represent image frames constituting a single moving image in different resolutions, so as to generate a moving image to be displayed on a display device by using the hierarchical moving image data; acquiring user operation input information related to a display area; and changing, in accordance with the operation input information, an area of the moving image that is to be displayed, wherein the changing of the area of the moving image includes switching a hierarchical layer used to generate a moving image in the hierarchical moving image data in accordance with a change in resolution determined by the operation input information.

Still another embodiment of the present invention relates to a data structure of a moving image file. The data structure is a data structure of a moving image file for display on a display device that maps a resolution determined by user operation input related to a display area to image frame sequences used by switching according to the resolution, the image frame sequences being a plurality of image frame sequences that respectively represent image frames constituting a single moving image in different resolutions.

Still another embodiment of the present invention relates to a data compression device. The data compression device comprises: a data division unit configured to form a coding unit by dividing, three-dimensionally, a data sequence subject to compression in a three-dimensional parameter space; and a compression coding unit configured: to generate, for each coding unit formed by the data division unit, a palette that retains two values of data as representative values and an index that retains, instead of original data of the coding unit, information specifying any one value among a plurality of intermediate values determined by linear interpolation of the representative values and the representative values; and to set the palette and the index to be compressed data.

Still another embodiment of the present invention relates to a data decoding device. The data decoding device comprises: a compressed data reading unit configured to read out, from a memory device, compressed data mapping, for each coding unit formed by dividing, three-dimensionally, a data sequence in a three-dimensional parameter space, a palette that retains two values of pixel values as representative values to an index that retains, instead of original data of the coding unit, information specifying any one value among a plurality of intermediate values determined by linear interpolation of the representative values and the representative values; a decoding unit configured to generate the intermediate values by linear interpolation of the representative values retained by the palette, to determine data included in each coding unit to have any one value among the representative values and the intermediate values in accordance with information retained by the index, and then to generate an original data sequence by reconstruction based on an array of the coding unit; and an output unit configured to output the generated data sequence.

Still another embodiment of the present invention relates to a data compression method. The data compression method comprises: reading out a data sequence subject to compression in a three-dimensional parameter space from a memory device; forming a coding unit by dividing, three-dimensionally, the data sequence; and generating, for each coding unit, a palette that retains two values of data as representative values and an index that retains, instead of original data of the coding unit, information specifying any one value among a plurality of intermediate values determined by linear interpolation of the representative values and the representative values and storing the palette and the index in the memory device as compressed data.

Still another embodiment of the present invention relates to a data decoding method. The data decoding method comprises: reading out, from a memory device, compressed data mapping, for each coding unit formed by dividing, three-dimensionally, a data sequence in a three-dimensional parameter space, a palette that retains two values of pixel values as representative values to an index that retains, instead of original data of the coding unit, information specifying any one value among a plurality of intermediate values determined by linear interpolation of the representative values and the representative values; generating the intermediate values by linear interpolation of the representative values retained by the palette, determining data included in each coding unit to have any one value among the representative values and the intermediate values in accordance with information retained by the index, and then generating an original data sequence by reconstruction based on an array of the coding unit; and outputting the generated data sequence to an output device.

Still another embodiment of the present invention relates to a data structure of a compressed moving image file. The data structure is a data structure wherein a palette which retains two values of pixel values as representative values and an index which retains, for each pixel, information specifying any one value among a plurality of intermediate values determined by linear interpolation of the representative values and the representative values are mapped to each other, the palette and the index being generated for each coding unit formed by temporally and spatially dividing each of a Y image sequence having luminance Y as a pixel value, a Cb image sequence having chrominance Cb as a pixel value, and a Cr image sequence having chrominance Cr as a pixel value that correspond to an image frame sequence constituting a moving image, and arranged in association with an image area of the image frame.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

In the display of a moving image, the present embodiment allows for the movement of a display area in response to a user request for moving a viewpoint. The movement of a viewpoint includes moving the viewpoint closer to or away from an image plane, and a moving image is enlarged or reduced in response while being reproduced. In the present embodiment, moving image data to be processed is in a hierarchical structure formed by hierarchizing in order of resolution a plurality of moving image streams each composed of an image frame sequence in which a single moving image is expressed in different resolution. By switching a moving image stream used for display to that of a different layer in response to a request for moving the viewpoint in a further or closer direction, an enlarged or reduced display is promptly presented. Hereinafter, moving image data having such a hierarchical structure will be also referred to as "hierarchical data".

Figure 1:
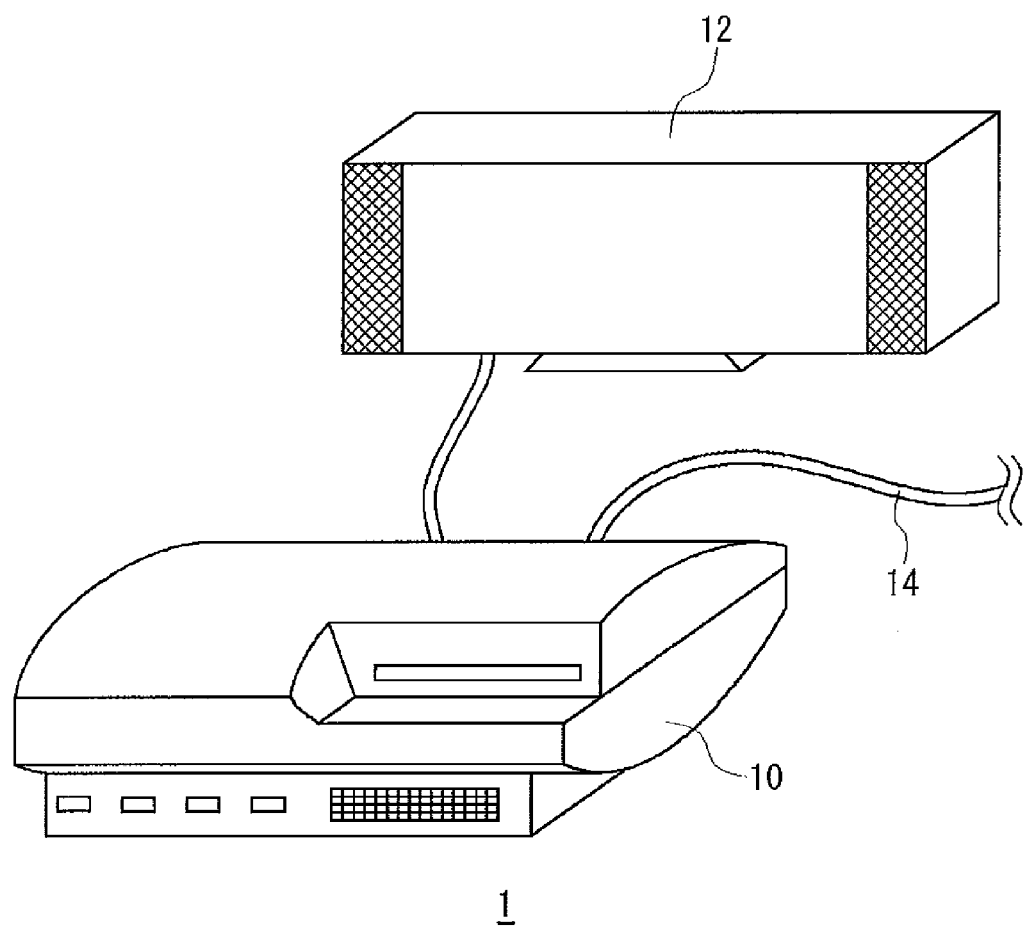
FIG. 1 is a diagram illustrating an environment in which an image processing system that can be applied in the present embodiment is used.

An explanation is first given of the basic mode of displaying such hierarchical data. FIG. 1 illustrates an environment in which an image processing system 1 to which the present embodiment can be applied is used. The image processing system 1 comprises an image processing device 10 for executing image processing software and a display device 12 for outputting a processing result by the image processing device 10. The display device 12 may be a television set that has a display for outputting an image and a speaker for outputting a sound.

The display device 12 may be connected to the image processing device 10 via a wired cable or connected wirelessly via a wireless LAN (Local Area Network) or the like. The image processing device 10 in the image processing system 1 may be connected to an external network such as the Internet by a cable 14 so as to download and acquire hierarchical data. The image processing device 10 may be connected to an external network via wireless communication.

The image processing device 10 may be, e.g., a game device or a personal computer, and an image processing function may be achieved by loading an application program for image processing. The image processing device 10 enlarges/reduces a moving image displayed on a display of the display device 12 or scrolls the moving image upward, downward, leftward, or rightward, in accordance with a request for moving a viewpoint from the user. Hereinafter, such a process of changing a display area including enlargement/reduction is referred to as "the movement of a display area". When the user operates an input device while viewing an image displayed on the display, the input device transmits to the image processing device 10 a signal requesting to move a display area.

Figure 2:
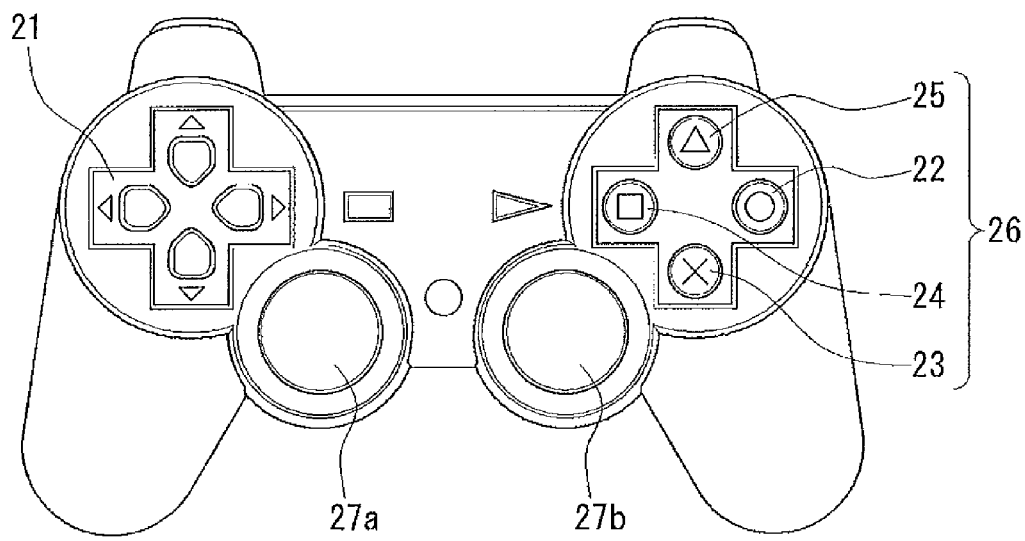
FIG. 2 is a diagram illustrating an example of the exterior configuration of an input device that can be applied to the image processing system of FIG. 1.

FIG. 2 illustrates an example of the exterior configuration of an input device 20. The input device 20 is provided with directional keys 21, analog sticks 27a and 27b, and four types of operation buttons 26 as operation means that can be operated by the user. The four types of buttons 26 comprise a circle button 22, a cross button 23, a square button 24, and a triangle button 25.

The operation means of the input device 20 in the image processing system 1 is assigned a function of entering a request for enlarging/reducing a display image and a function of entering a request for scrolling upward, downward, leftward, or rightward. For example, the function of entering a request for enlarging/reducing a display image may be assigned to the right analog stick 27b. The user can input a request for reducing a display image by pulling the analog stick 27b toward the user and input a request for enlarging the display image by pushing the analog stick 27b away from the user.

The function of entering a request for scrolling may be assigned to the directional keys 21. By pressing the directional keys 21, the user can enter a request for scrolling in the direction in which the directional keys 21 are pressed. The function of entering a request for moving a display area may be assigned to an alternative operation means. For example, the function of entering a request for scrolling may be assigned to the analog stick 27a.

The input device 20 has a function of transmitting to the image processing device 10 a signal requesting to move a display area that has been input. In the present embodiment, the input device 20 is configured such that the input device 20 is capable of communicating wirelessly with the image processing device 10. The input device 20 and the image processing device 10 may establish a wireless connection using Bluetooth (registered trademark) protocol or IEEE 802.11 protocol. The input device 20 may be connected to the image processing device 10 via a cable so as to transmit to the image processing device 10 a signal requesting to move a display area. The input device 20 is not limited to the one shown in FIG. 2. As long as the input device 20 is an interface such as a keyboard, a touch panel, a button, a camera, a microphone, etc., that is capable of acquiring user's intention as electronic information, the type and the exterior configuration of the input device 20 are not limited.

Figure 3:
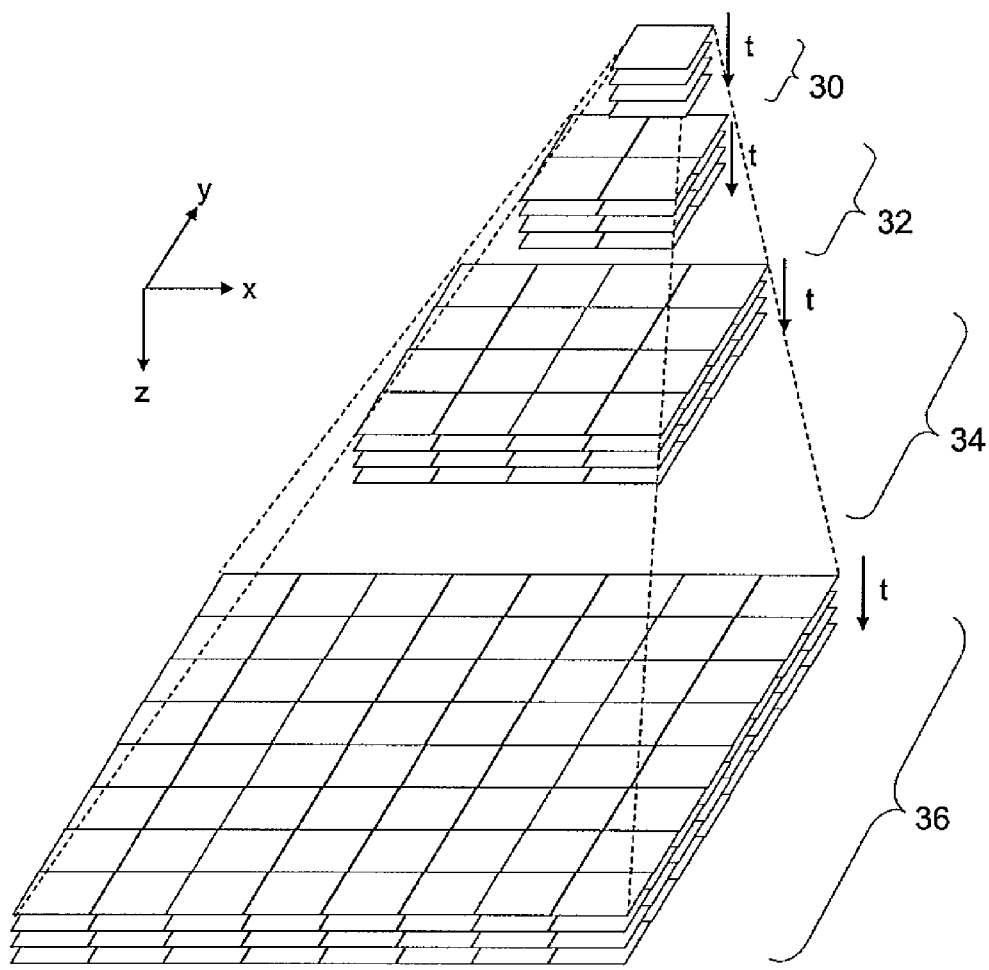
FIG. 3 is a diagram conceptually illustrating hierarchical data of a moving image to be processed in the present embodiment.

FIG. 3 conceptually illustrates hierarchical data of a moving image to be processed in the present embodiment. The hierarchical data has a hierarchical structure comprising a 0-th layer 30, a first layer 32, a second layer 34, and a third layer 36 in a z axis direction, which is the direction from the top to the bottom of the figure. While the figure only shows four layers, the number of layers is nonrestrictive. As described above, each layer is composed of moving image data of a single moving image expressed in different resolution, i.e., data of a plurality of image frames arranged in chronological order. In the figure, each layer is symbolically expressed by four image frames. The number of image frames obviously varies depending on the reproduction time and the frame rate of a moving image.

As described later, the present embodiment is excellent in random accessibility to a three-dimensional space defined by an image plane and a time axis of moving image data. Therefore, for example, by considering the time axis as the "depth", three-dimensional volume data instead of moving image data may be used as a processing target. Similarly, as long as the data that is used can have redundancy in the three-dimensional direction, the type of a parameter is not particularly limited.

The hierarchical data has, for example, a quadtree hierarchical structure; when image frames that constitute the layers are divided into "tile images" having the same size, the 0-th layer 30 is composed of one tile image, the first layer 32 is composed of 2×2 tile images, the second layer 34 is composed of 4×4 tile images, and the third layer is composed of 8×8 tile images, and the like. In this case, the resolution in an N-th layer (N is an integer equal to or greater than 0) is ½ the resolution of the (N+1)-th layer in both the horizontal (X axis) direction and the vertical (Y axis) direction on an image plane. The hierarchical data can be generated by, e.g., reducing an image frame in a plurality of stages based on a moving image in the third layer 36 having the highest resolution.

Both the coordinates of a viewpoint at the time of the display of a moving image and a corresponding display area can be expressed in a virtual three-dimensional space formed by an x axis representing the horizontal direction of the image, a y axis representing the vertical direction of the image, and a z axis representing the resolution, as shown in FIG. 3. As described above, moving image data in which a plurality of image frames are sequentially arranged is prepared as a layer in the present embodiment. Thus, an image that is actually displayed also depends on the amount of time spent since the start of the reproduction. Therefore, the time axis t is also shown for each layer in the figure.

The image processing device 10 basically renders an image frame of any one of the layers along a time axis t in series at a predetermined frame rate. For example, the image processing device 10 displays a moving image of the resolution of the 0-th layer 30 as a reference image. If a signal requesting to move the display area is provided from the input device 20 during this process, the image processing device 10 derives the amount of change in the display image from the signal and derives the coordinates at the four corners of a subsequent frame (frame coordinates) in the virtual space by using the amount of change. The image processing device 10 then renders an image frame that corresponds to the frame coordinates. In this case, by providing a switching boundary for layers with respect to the z axis, the image processing device 10 appropriately switches the layers of the moving image data used for frame rendering in accordance with the value of z of the frame coordinates.

Instead of the frame coordinates in the virtual space, the image processing device 10 may derive both information identifying a layer and the texture coordinates (UV coordinates) in the layer. Hereinafter, the combination of the information identifying a layer and the texture coordinates will be also referred to as frame coordinates.

The hierarchical data is compressed in a predetermined compression format and is stored in a memory device in the image processing device 10. Then, data necessary for frame rendering is read from the memory device and decoded. FIG. 3 conceptually shows hierarchical data and does not limit the storage order or the format of data stored in the memory device. For example, as far as the position of hierarchical data in a virtual space is mapped to an actual storage area of moving image data, the moving image data can be stored in an arbitrary area. As described later, spatial division and/or temporal division may be performed on an image frame sequence that constitutes each layer, and compression coding may be performed in units thereof.

Figure 4:
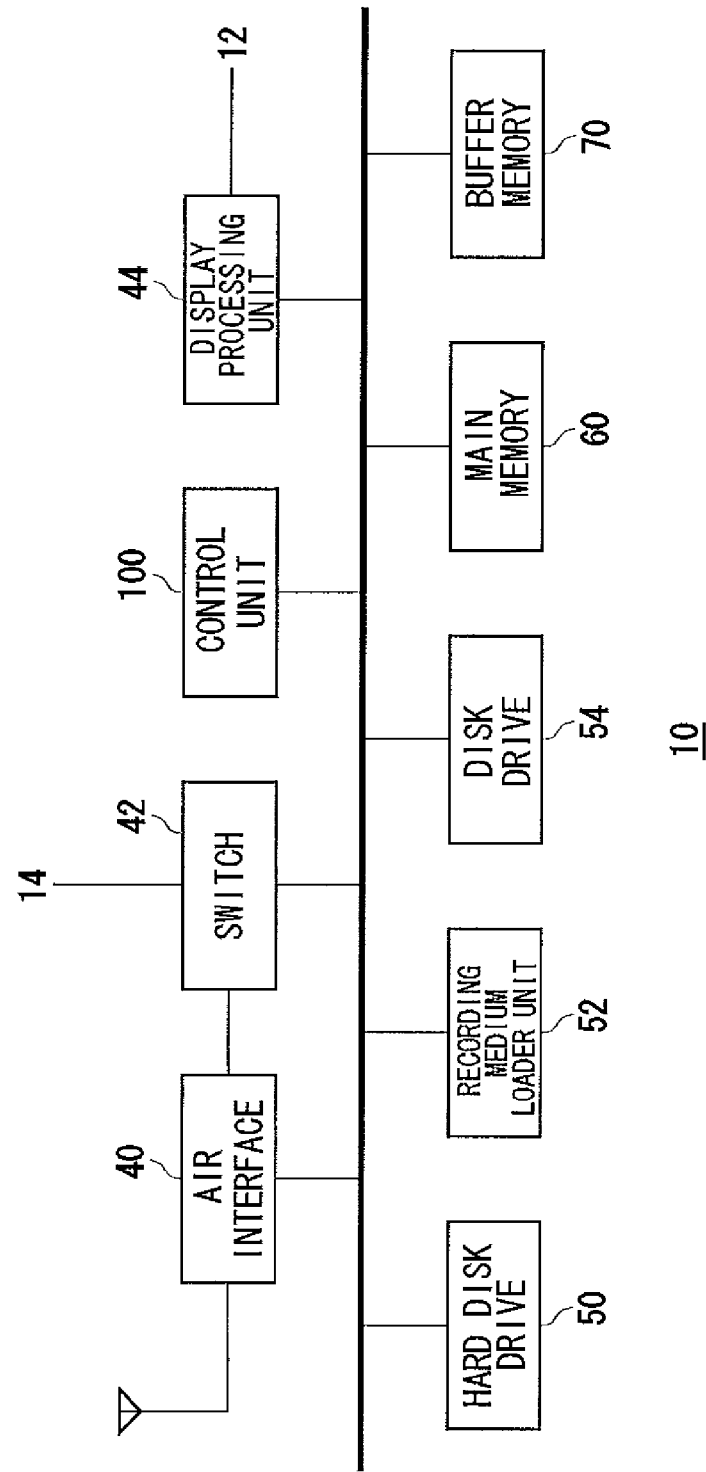
FIG. 4 is a diagram illustrating the configuration of an image processing device in the present embodiment.

FIG. 4 illustrates the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 is connected to an external network via the cable 14 so as to receive hierarchical data from an image server. The switch 42 is connected to the air interface 40. The air interface 40 is connected to the input device 20 using a predefined wireless communication protocol. A signal requesting to move a display area as input by the user via the input device 20 is supplied to the control unit 100 via the air interface 40 and the switch 42.

The hard disk drive 50 functions as a memory device for storing data. The hierarchical data may be stored in the hard disk drive 50. When a removable recording medium such as a memory card is mounted, the recording medium loader unit 52 reads data from the removable recording medium. When a read-only ROM disk is mounted, the disk drive 54 drives and recognizes the ROM disk so as to read data. The ROM disk may be an optical disk or a magneto-optical disk. The hierarchical data may be stored in the recording medium.

The control unit 100 is provided with a multicore CPU. One general-purpose processor core and a plurality of simple processor cores are provided in a single CPU. The general-purpose processor core is referred to as a power processing unit (PPU), and the other processor cores are referred to as synergistic-processing units (SPU). The control unit 100 may be further provided with a graphics processing unit (GPU).

The control unit 100 is provided with a memory controller connected to the main memory 60 and the buffer memory 70. The PPU is provided with a register and a main processor as an entity of calculation execution. The PPU efficiently allocates to the respective SPUs tasks as basic units of processing in applications to be executed. The PPU itself may execute a task. The SPU is provided with a register, a subprocessor as an entity of calculation execution, and a local memory as a local memory area. The local memory may be used as the buffer memory 70.

The main memory 60 and the buffer memory 70 are memory devices and are formed as random access memories (RAM). The SPU is provided with a dedicated direct memory access (DMA) controller as a control unit and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

The image processing device 10 sequentially loads, in advance, moving image data that is closely related in a spatial and temporal manner to a frame that is currently displayed from the hard disk drive 50 into the main memory 60 in order to smoothly perform enlargement/reduction or scrolling of a display image. Further, the image processing device 10 decodes a part of the moving image data loaded into the main memory 60 and stores the decoded data in the buffer memory 70 in advance. With this, a display area can be smoothly moved while progressing reproduction of a moving image. In this case, data to be loaded or decoded may be determined by predicting an area that will become necessary thereafter based on the earlier direction of movement of the display area.

In the hierarchical data shown in FIG. 3, the position in the Z axis direction indicates the resolution. The closer to the 0-th layer 30, the lower the resolution. The closer to the third layer 36, the higher the resolution. In terms of the size of an image displayed on the display, the position in the z-axis direction represents the scale. Assuming that the scaling factor of the displayed image in the third layer 36 is 1, the scaling factor in the second layer 34 is ¼, the scaling factor in the first layer 32 is 1/16, and the scaling factor in the 0-th layer 30 is 1/64.

Therefore, if the display image changes in the z-axis direction away from the 0-th layer 30 toward the third layer 36, the displayed image is enlarged. If the displayed image changes in the direction away from the third layer 36 toward the 0-th layer 30, the displayed image is reduced. For example, when the scale factor of a display image is close to that of the second layer 34, the display image is generated by using the image data of the second layer 34.

More specifically, as described above, switching boundaries are provided to, e.g., respective intermediate scale factors of the layers. For example, if the scale factor of an image to be displayed is in between a switching boundary between the first layer 32 and the second layer 34 and a switching boundary between the second layer 34 and the third layer 36, the image data of the second layer 34 is used to render a frame. When the scale factor is in between the second layer 34 and the switching boundary between the first layer 32 and the second layer 34, the image frame of the second layer 34 is reduced for display. When the scale factor is in between the second layer 34 and the switching boundary between the second layer 34 and the third layer 36, the image frame of the second layer 34 is enlarged for display.

Meanwhile, when identifying and decoding an area that will become necessary in the future, which is predicted by a signal requesting to move a display area, the scale factor of each layer or the like is set as a prefetch boundary in advance. For example, when the reduction scale requested by the signal requesting to move the display area exceeds the scale factor of the second layer 34, the image processing device 10 prefetches at least a part of the image data of the first layer 32 located in the direction of reduction from the hard disk drive 50 or the main memory 60, decodes the prefetched image data, and writes the decoded image data in the buffer memory 70.

The same applies to an image prefetch process in the upward, downward, leftward, or rightward direction. More specifically, a prefetch boundary is set in the image data developed in the buffer memory 70 in advance so that, when a display position indicated by a signal requesting to move the display area exceeds the prefetch boundary, the prefetch process is started. With this, a mode can be realized where moving-image reproduction is progressed while smoothly changing the resolution and the display position in accordance with a request for moving the display area from the user.

Figure 5:
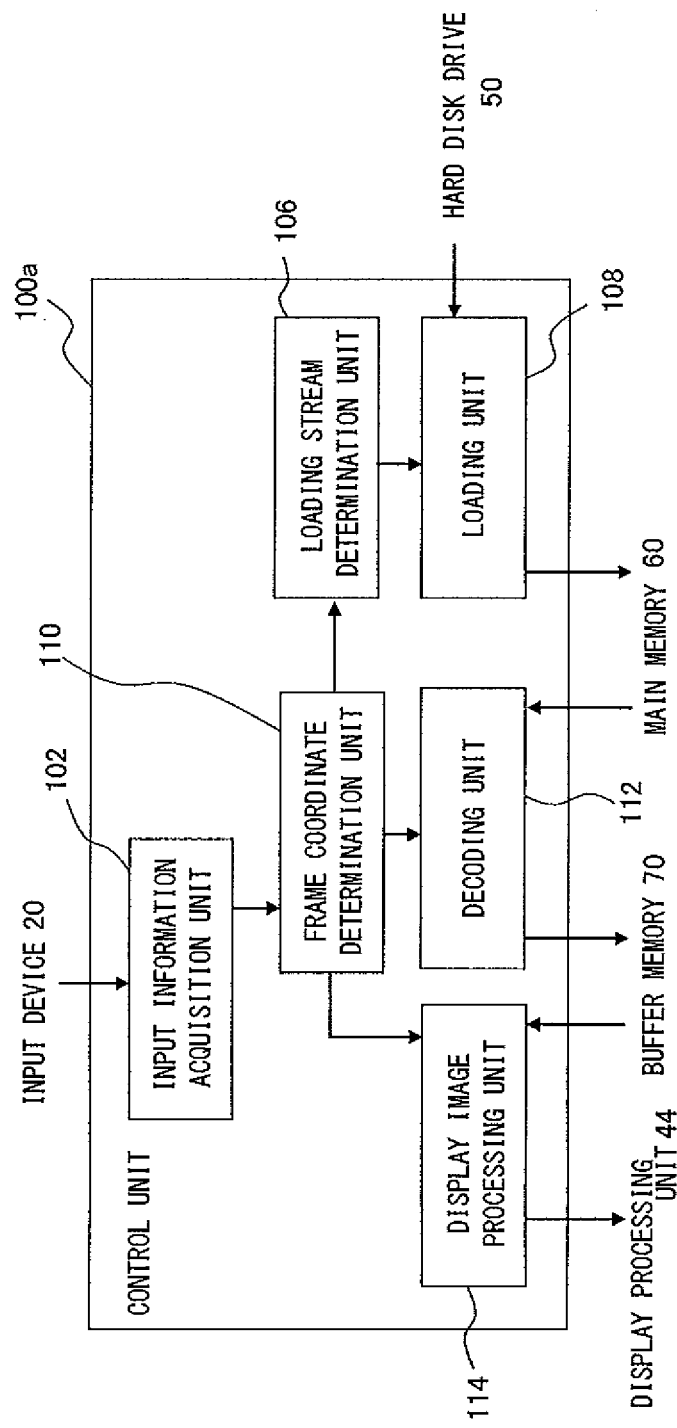
FIG. 5 is a diagram illustrating, in detail, the configuration of a control unit having a function of displaying a moving image using moving image data having a hierarchical structure in the present embodiment.

FIG. 5 illustrates, in detail, the configuration of a control unit 100a having a function of displaying a moving image using moving image data having a hierarchical structure in the present embodiment. The control unit 100a comprises an input information acquisition unit 102 for acquiring information entered by the user via the input device 20, a frame coordinate determination unit 110 for determining the frame coordinates of an area to be newly displayed, a loading stream determination unit 106 for determining compressed data of a moving image stream to be newly loaded, and a loading unit 108 for loading a necessary moving image stream from the hard disk drive 50. The control unit 100a further comprises a decoding unit 112 for decoding compressed data of a moving image stream and a display image processing unit 114 for rendering an image frame.

Figure 10:
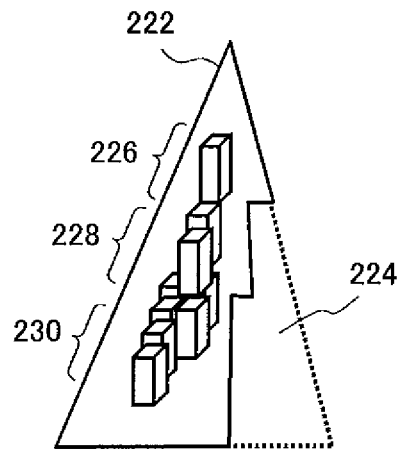
FIG. 10 is a diagram schematically illustrating the data structure of a moving image when moving image streams of some layers are replaced by moving image streams of another layer in the present embodiment.

In FIG. 5 and FIG. 10 described later, the elements shown in functional blocks that indicate a variety of processes are implemented in hardware by any CPU (Central Processing Unit), memory, or other LSI's, and in software by a program loaded in memory, etc. As stated previously, the control unit 100 has one PPU and a plurality of SPU's, and functional blocks can be formed by a PPU only, a SPU only, or the cooperation of both. Therefore, it will be obvious to those skilled in the art that the functional blocks may be implemented in a variety of manners by a combination of hardware and software.

The input information acquisition unit 102 acquires a request entered by the user via the input device 20 to start/terminate moving-image reproduction, move the display area, etc., and notifies the frame coordinate determination unit 110 of the request. The frame coordinate determination unit 110 determines the frame coordinates of an area to be newly displayed in accordance with the frame coordinates of the current display area and a signal requesting to move the display area entered by the user and notifies the loading stream determination unit 106, the decoding unit 112, and the display image processing unit 114 of the determined frame coordinates.

The loading stream determination unit 106 identifies the compressed data of a moving image to be newly loaded from the hard disk drive 50 into the main memory 60 based on the frame coordinates as notified from the frame coordinate determination unit 110 and issues a load request to the loading unit 108. As described later, hierarchical data according to the present embodiment retains a moving image stream in a unit of tile image sequence obtained by spatially dividing, in the same size, frame image sequences constituting each layer.

Therefore, in addition to a correspondence relationship between reduction scales and respective layers used for the display, spatial coordinates in each layer are mapped in advance to identification information of a moving image stream including image data that corresponds to the coordinates and a storage area thereof. Based on the information, the loading stream determination unit 106 acquires identification information of a necessary moving image stream. If the compressed data of a corresponding moving image stream has not been loaded, the loading stream determination unit 106 issues a load request to the loading unit 108. Even when the frame coordinates do not change, the loading stream determination unit 106 sequentially requests to load the compressed data of the necessary moving image stream in accordance with the progress of the moving image.

The loading stream determination unit 106 may identify, in addition to a moving image stream necessary for frame rendering at that point, a moving image stream predicted to become necessary thereafter by, e.g., the prefetch process described earlier and issue a load request to the loading unit 108. While the loading unit 108 is not performing the loading process, the loading stream determination unit 106 may issue a load request at a predetermined time. For example, the loading stream determination unit 106 may issue a load request at predetermined time intervals or when the user enters a request to move the display area. The loading unit 108 performs loading from the hard disk drive 50 in accordance with a request from the loading stream determination unit 106. More specifically, the loading unit 108 identifies a storage area based on the identification information of a moving image stream to be loaded and stores data that has been read from the storage area in the main memory 60.

Based on frame coordinates at each point in time, the decoding unit 112 reads out the data of the necessary moving image stream from the main memory 60, decodes the data that has been read, and sequentially stores the decoded data in the buffer memory 70. A decoding target may be in units of moving image streams. When an area defined by frame coordinates determined by the frame coordinate determination unit 110 is located across a plurality of moving image streams, the decoding unit 112 decodes the plurality of moving image streams. Based on the frame coordinates at each point in time, the display image processing unit 114 reads the data of a corresponding image frame from the buffer memory 70 and renders the data in the frame memory of the display processing unit 44.

In a mode where the movement of a display area including enlargement and reduction is allowed during the reproduction of a single moving image, it is desirable that all the layers share a time axis and that frame rendering progress seamlessly regardless of whether or not the layer of moving image data to be used is switched. Thus, as described above, hierarchical data is generated in advance using an image frame as a moving image stream in units of tile images. With this, an area necessary for single display or data predicted to become necessary thereafter can be preferentially loaded and decoded. Thus, efficiency can be improved in processes that are necessary prior to frame rendering. Also, it is desirable that data be prepared in a condition that allows for random access also in a temporal manner.

Moving image data subject to processing according to the present embodiment has four-dimensional parameters, i.e., three-dimensional frame coordinates including the direction of reduction scales and time. Therefore, a unit for generating a moving image stream and the entire configuration can be appropriately changed in accordance with a compression method and the contents of a moving image. FIGS. 6-9 illustrate examples of the structure of moving image data to be processed in the present embodiment.

In these figures, a triangle represents hierarchical data of a moving image, and a cuboid represents a single moving image stream. Each item of hierarchical data is composed of three layers: a 0-th layer, a first layer, and a second layer. However, the number of layers is not limited to this. As described above, a single moving image stream is generated for each tile image obtained by dividing an image frame of each layer into the same size. In these examples, the size of an image in a 0-th layer is set to be the size of a tile image.

Figure 6:
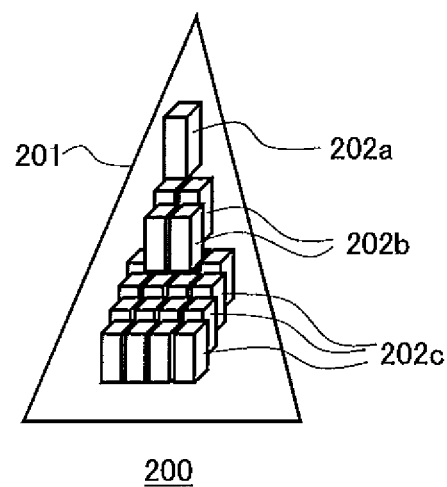
FIG. 6 is a diagram illustrating an example of the structure of moving image data to be processed in the present embodiment.

First, a moving image data structure 200 shown in FIG. 6 is composed of a single item of hierarchical data 201 where a single moving image stream from the start to the end of a moving image is set for each tile image in each layer. In this case, tile images, which are image frames of respective moving image streams, are the same size. Thus, the 0-th layer, the first layer, and the second layer are composed of one moving image stream 202a, four moving image streams 202b, and sixteen moving image streams 202c, respectively.

In the case of the moving image data structure 200 shown in FIG. 6, the length of a moving image stream in the temporal direction changes according to the original length of a moving image, i.e., the original number of image frames. Therefore, this is advantageous when the number of image frames is originally small or when a compression method that allows for long-term data compression and random access is used, e.g., when a moving picture experts group (MPEG) in which all frames are set to be I pictures is used.

Figure 7:
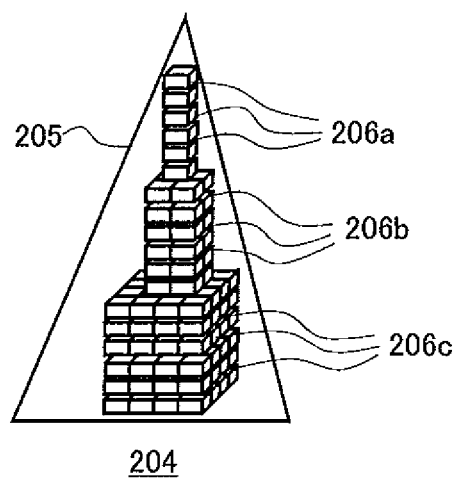
FIG. 7 is a diagram illustrating an example of the structure of moving image data to be processed in the present embodiment.

A moving image data structure 204 shown in FIG. 7 is composed of a single item of hierarchical data 205 where moving image data is separated by a predetermined number of image frames and where a plurality of moving image streams are set for each tile image in the direction of a time axis in each layer. In other words, moving image streams in the figure are those obtained by dividing the moving image streams shown in FIG. 6 along a time axis, which is the longitudinal direction of the figure. In this example, the moving image streams shown in FIG. 6 are each divided into six moving image streams. Therefore, the 0-th layer, the first layer, and the second layer are composed of 1×6 moving image streams 206a, 4×6 moving image streams 206b, and 16×6 moving image streams 206c, respectively. Such a structure is employed when a compression method for performing compression in units of a fixed number of image frames is used.

Figure 8:
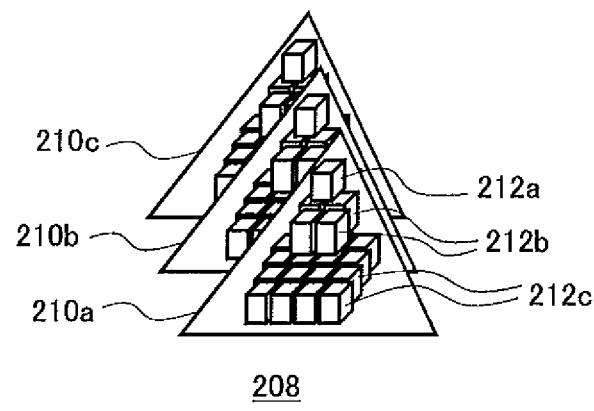
FIG. 8 is a diagram illustrating an example of the structure of moving image data to be processed in the present embodiment.

A moving image data structure 208 shown in FIG. 8 has a structure where moving image data is separated by a predetermined number of image frames and where individual hierarchical data 210a, hierarchical data 210b, and hierarchical data 210c are generated for each set of moving image streams generated in the units. In other words, the hierarchical data 210a, the hierarchical data 210b, and the hierarchical data 210c are each constructed of a single moving image stream in each layer in the direction of a time axis similarly to the case of FIG. 6, but each moving image stream has a fixed number of image frames. For example, in the hierarchical data 210a, a 0-th layer, a first layer, and a second layer are composed of one moving image stream 212a, four moving image streams 212b, and sixteen moving image streams 212c, respectively.

In the case of the moving image data structure 208 in FIG. 8, the structure is constructed of a plurality of items of hierarchical data in the direction of the time axis. Thus, moving-image editing can be easily performed in the direction of the time axis such as replacement with another hierarchical data for only a certain scene, insertion of hierarchical data, deletion of hierarchical data, etc. Since the number of image frames of each moving image stream is fixed, the data size can be easily estimated. For example, when a compression method described later is applied, the data of each moving image stream can have a structure similar to that of the data of a tile image obtained when a still image is similarly presented in a hierarchical structure. Therefore, it can be easily realized to utilize a display mechanism of still images for the display of moving images, or to combine a still image with a moving image, e.g., to make the still image a part of the moving image.

Figure 9:
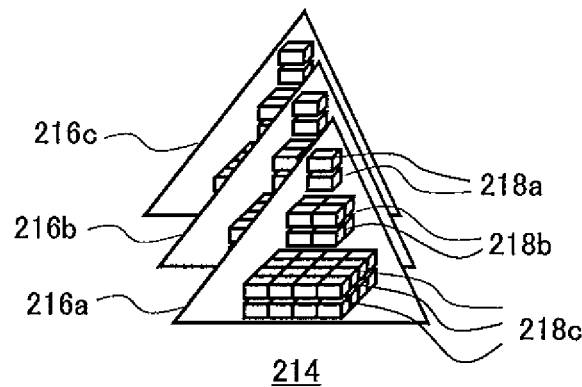
FIG. 9 is a diagram illustrating an example of the structure of moving image data to be processed in the present embodiment.

A moving image data structure 214 shown in FIG. 9 has a structure where moving image data is separated by a predetermined number of image frames and where moving image streams generated in the units are grouped into sets of a predetermined number so as to form individual hierarchical data 216a, hierarchical data 216b, and hierarchical data 216c. In other words, the hierarchical data 216a, the hierarchical data 216b, and the hierarchical data 216c are each constituted by a plurality of moving image streams in each layer in the direction of a time axis similarly to the case of FIG. 7, but the number of the moving image streams is fixed regardless of the length of the moving-image. In the case of the figure, the hierarchical data is generated such that the number of the moving image streams becomes two.

For example, in the hierarchical data 216a, a 0-th layer, a first layer, and a second layer are composed of 1×2 moving image streams 218a, 4×2 moving image streams 218b, and 16×2 moving image streams 218c, respectively. Also in this case, the estimation and the adjustment of the data size of each of layers constituting a single item of hierarchical data can be easily performed, and moving-image editing can be easily performed in the direction of the time axis by the replacement of hierarchical data.

In all the moving image data structures shown in FIGS. 6-9, moving image streams are retained such that the entire area of an image frame is covered in each layer. Alternatively, some of the moving image streams may be cut out from the moving image data in accordance with redundancy of a moving image and replaced with moving image streams of another layer. FIG. 10 schematically illustrates the data structure of a moving image when moving image streams of some layers are replaced by moving image streams of another layer. The data structure is expressed in the same way as in FIG. 6. In hierarchical data 222 shown in the figure, moving image streams corresponding to an area 224 are cut out.

In comparison to the hierarchical data 201 shown in FIG. 6, the number of moving image streams is smaller in a first layer 228 and in a second layer 230. The difference in the number represents the number of moving image streams that have been cut out. In this case, no data exists in the area represented by the moving image streams that have been cut out in the layers. Thus, in the case where an area concerned is displayed by a scale by which data of such a layer is to be used, another layer that retains data of the corresponding area, the 0-th layer 226 in the example of the figure, is searched so that the corresponding area is enlarged and rendered.

Such an embodiment can be applied when there is an area that does not require detailed information in an image frame, e.g., an area almost made up of a single color such as sky, ocean, grass, etc. The presence of redundancy in an image frame can be detected by image analysis. For example, for each image frame at each point in time, a differential image between an image obtained by enlarging an image frame of a low-resolution layer and a high-resolution image is generated so as to detect an area where a difference value is equal to or below a predetermined threshold value. Moving image streams of the high-resolution layer, among moving image streams representing the detected area, are then eliminated from the moving image data.

With this, the size of the moving image data can be small, and a part of a process of loading moving image streams can be omitted. In such a case, rendering can be performed by mapping in advance the coordinates of an area corresponding to an eliminated moving image stream to identification information of a moving image stream of an upper layer that is to be enlarged, and then by further adding information such as magnification and the like, in the previously-stated information that maps three-dimensional coordinates determined by hierarchical data to a moving image stream.

An example shown in FIG. 10 represents a mode realized by having both a feature of expressing moving image data in a hierarchical structure and a feature of spatially dividing a frame image so as to generate moving image streams separately in the present embodiment. In other words, by dividing a frame image into tile images, a format for storing data can be changed locally, and, furthermore, data of a low-resolution layer can be used alternatively. Therefore, a part of data can be omitted so as to reduce the data size. Applying a similar idea, only for some moving image streams, the number of the moving image frames may be reduced by thinning out the frames so as to reduce the data size.

Although the temporal resolution is lowered in an area associated to the moving image streams, this is effective in a moving image where an area with little change over time such as a background is included. As in the case of the above-stated spatial redundancy, the time redundancy in this case can be determined by, for example, detecting an area having a difference value that is equal to or below a predetermined threshold value from differential images between adjacent image frames. Similarly, some moving image streams can be replaced with a still image.

Also, a compression method may be changed for each moving image stream. Further, various types of image expressions may be made possible by purposely changing a time axis for each predetermined unit such as each layer, each moving image stream, each pixel array in an image, and the like, instead of sharing a time axis within hierarchical data.

As described above, in the hierarchical structure of moving image data to be displayed in the present embodiment, a compression method of an individual moving image stream is not particularly restricted, and any one of existing methods such as JPEG (Joint Photographic Experts Group), MPEG, S3TC (S3 Texture Compression), or the like may be applied. In order to seamlessly move a display area even when switching layers, it is desired that random access can be performed spatially and temporally and that both image quality and decoding throughput be maintained even for a high-definition image.

Next, an explanation is given regarding a method for compressing moving image streams in units of a fixed number of image frames that can be applied to a moving image data structure shown in FIGS. 7-9. This compression method can be also applied to a single moving image stream in addition to a plurality of moving image streams that constitute hierarchical data. A device that executes this compression method can be also realized by a configuration similar to that of the image processing device 10 shown in FIG. 4. An explanation is given in the following focusing mostly on the configuration of a control unit 100.

Figure 11:
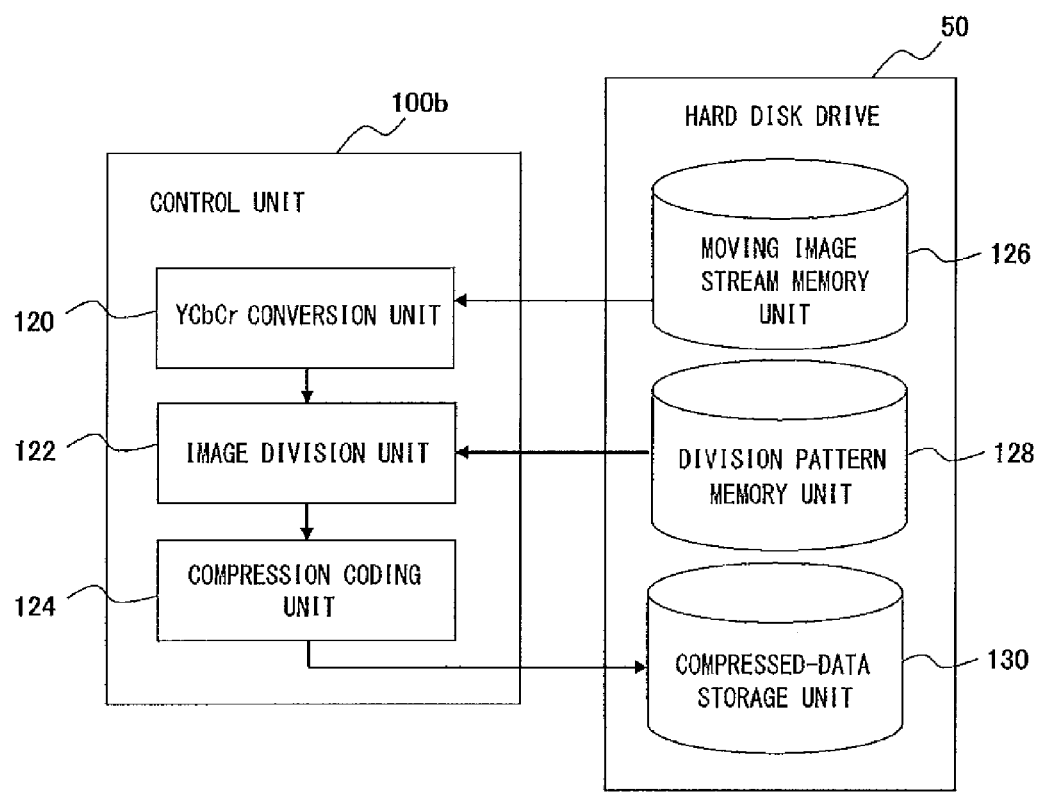
FIG. 11 is a diagram illustrating, in detail, the configuration of a control unit having a function of compressing moving image data and a hard disk drive in the present embodiment.

FIG. 11 illustrates, in detail, the configuration of a control unit 100b having a function of compressing moving image data and a hard disk drive 50 in the present embodiment. The control unit 100b comprises an YCbCr conversion unit 120 for converting a color space of an image frame constituting a moving image stream that is to be compressed into YCbCr, an image division unit 122 for temporally and spatially dividing an image sequence as converted so as to generate coding units, and a compression coding unit 124 for performing a compression coding process by quantizing image data for each coding unit that has been divided.

The hard disk drive 50 comprises a moving image stream memory unit 126 for storing a moving image stream to be compressed that is composed of an individual image frame sequence, a division pattern memory unit 128 for storing a division pattern used when the image division unit 122 divides an image sequence, and a compressed-data memory unit 130 for storing compressed data generated by compression coding by the compression coding unit 124.

The YCbCr conversion unit 120 sequentially reads out from the moving image stream memory unit 126 data of image frames that compose a moving image stream to be compressed. Then, by converting RGB values, which are pixel values of each image frame, into values of luminance Y, values of chrominance Cb, and values of chrominance Cr, the YCbCr conversion unit 120 generates a Y image, a Cb image, and a Cr image having the respective values of the luminance Y, the chrominance Cb, and chrominance Cr as their pixel values, respectively. An existing method can be applied to the conversion of a color space from RGB to YCbCr. Since a Y image, a Cb image, and a Cr image are generated from a single image frame, a Y image sequence, a Cb image sequence, and a Cr image sequence are generated for a plurality of image frame that constitute a moving image stream.

Among the Y image sequence, the Cb image sequence, and the Cr image sequence generated by the YCbCr conversion unit 120, the image division unit 122 first reduces Cb images and Cr images at a predetermined rate. The image division unit 122 then temporally and spatially divides the Y image sequence, the reduced Cb image sequence, and the reduced Cr image sequence in a division pattern stored in the division pattern memory unit 128. Units generated by the division are referred to as "coding units".

The most suitable division pattern differs according to the contents of an image. Thus, the image division unit 122 may perform a process of selecting the most suitable pattern from among the plurality of division patterns stored in the division pattern memory unit 128. The details will be described later. A reduced Cb image and a reduced Cr image are treated as a pair for each corresponding frame in processes that are performed thereafter. Hereinafter, such a pair of a Cb image and a Cr image is referred to as a "CbCr image".

The compression coding unit 124 performs quantization and compression coding of image data by generating, for each coding unit of an Y image and a CbCr image, a palette that indicates two representative values and an index that specifies, for each pixel, any one among the two representative values and a plurality of intermediate values obtained by linear interpolation of the representative values. With this, a palette and an index are generated for each coding unit of a Y image sequence and for each coding unit of a CbCr image sequence.

Figure 12:
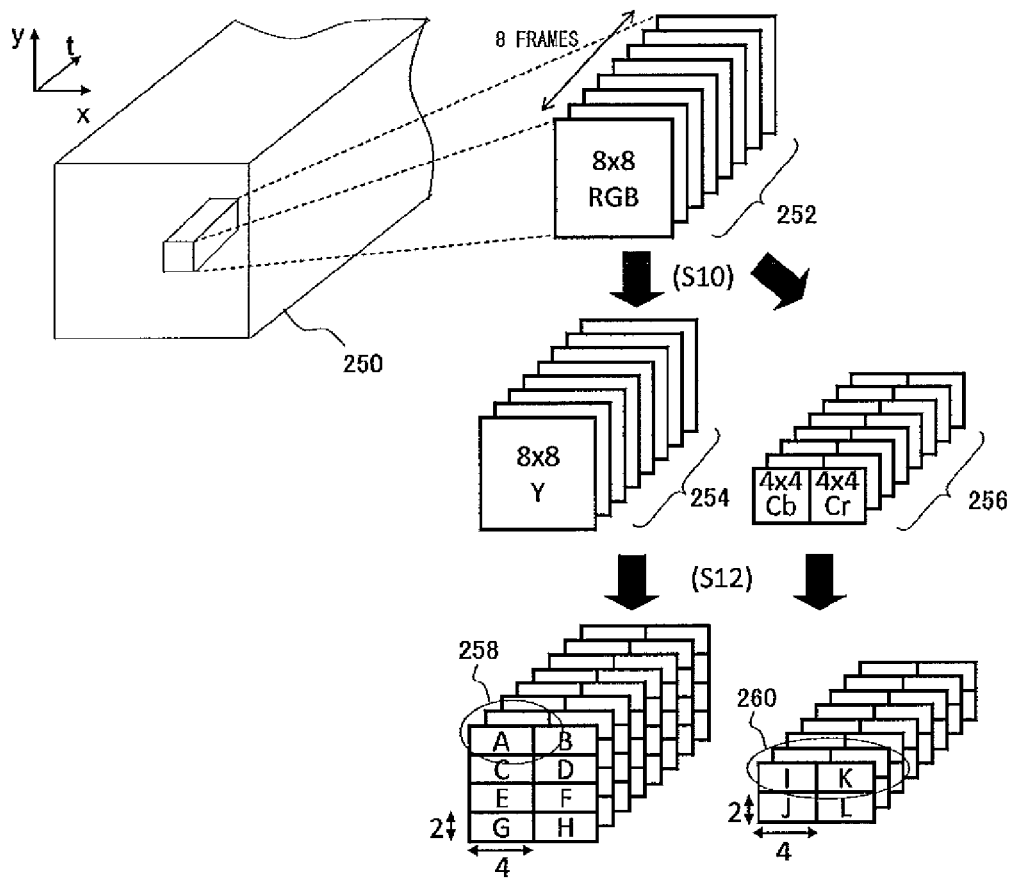
FIG. 12 is a diagram schematically illustrating a procedure of compressing a moving image stream performed by an image processing device including the control unit shown in FIG. 11.

FIG. 12 schematically illustrates a procedure of compressing a moving image stream performed by an image processing device 10 including a control unit 100b. A moving image stream 250 to be compressed may correspond to, for example, a moving image stream shown by a cuboid in FIGS. 6 through 9. The moving image stream 250 is composed of frames of RGB images. In this compression method, a moving image stream 250 is compressed for every predetermined number of image frames. In an example of FIG. 12, the moving image stream 250 is compressed for every eight frames.

First, the YCbCr conversion unit 120 further divides image frames that account for eight frames spatially in a predetermined size and determines a processing unit in a three-dimensional space of an image plane (x,y) and a time axis t. In the example of the figure, data for eight frames of 8 pixels×8 pixels is set to be a processing unit 252. Next, a Y image sequence 254 of eight Y images and a CbCr image sequence 256 of eight CbCr images are generated from eight RGB images included in the processing unit 252 (S10).

As described above, the CbCr image sequence 256 is an image sequence obtained by reducing Cb images and Cr images, which have been directly obtained from the original RGB images, to ½ size in both vertical and horizontal directions. Therefore, the Y image sequence 254 will have eight image frames of 8 pixels×8 pixels, and the CbCr image sequence 256 will have eight frames of an image in which a Cb image of 4 pixels×4 pixels and a Cr image of 4 pixels×4 pixels are connected.

The image division unit 122 then forms coding units by temporally and spatially dividing the Y image sequence 254 and the CbCr image sequence 256 by any one of the division patterns stored in the division pattern memory unit 128 (S12). In the example of the figure, set to be a coding unit is data for two image frames of 4 pixels×2 pixels that is obtained by grouping, for every two image frames in the temporal direction, image blocks obtained by spatially dividing image frames of the Y image sequence 254 and the CbCr image sequence 256 in the same size of 4 pixels across×2 pixels down.

As described above, since the Y image sequence 254 is composed of 8 pixels×8 pixels image frames, each of the image frames is divided into eight image blocks "A", "B", "C", "D", "E", "F", "G", and "H". A coding unit 258 is formed by an image block "A" of a first frame and an image block "A" of a second frame (a shaded area). The same applies to other image blocks and image frames. As a result, 32 coding units (spatial division number of 8×temporal division number of 4) are formed for the Y image sequence 254.

On the other hand, since the CbCr image sequence 256 is composed of 4 pixels×4 pixels image frames for both a Cb image and a Cr image, the former image is divided into two image blocks "I" and "J", and the latter image is divided into two image blocks "K" and "L". Then a coding unit 260 is formed by image blocks "I" and "K" of a first frame and image blocks "I" and "K" of a second frame (a shaded area). The same applies to other image blocks and image frames. As a result, 8 coding units (spatial division number of 2×temporal division number of 4) are formed for the CbCr image sequence 256.

Figure 13:
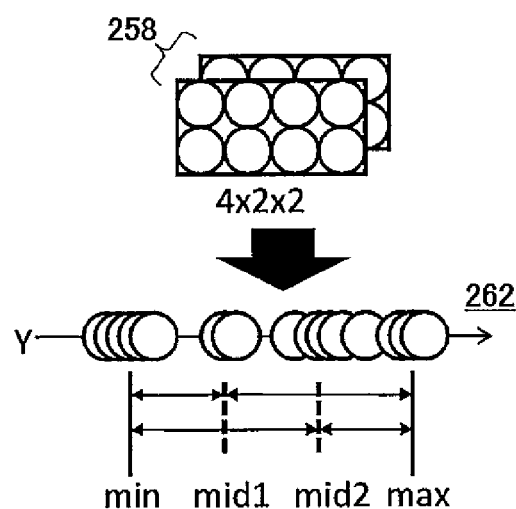
FIG. 13 is a diagram schematically illustrating a method for generating data of a palette and an index from a coding unit of a Y image sequence in the present embodiment.

The compression coding unit 124 generates data of a palette and an index for each coding unit. The palette and the index are basically the same as a palette and an index generated from an RGB image in a texture compression method of S3TC. On the other hand, the number of dimensions of a parameter in the present embodiment is different from commonly-used S3TC. FIG. 13 schematically illustrates a method for generating data of a palette and an index from a coding unit 258 of the Y image sequence 254.

When division is performed using a pattern shown in FIG. 12, the coding unit 258 includes 4×2×2=16 pixels. In the figure, each pixel is schematically shown in a circle. When a sample value of luminance Y, which each pixel has as a pixel value, is shown on an axis of the luminance Y, a distribution 262 is obtained. Out of sixteen samples plotted in the distribution 262, two representative values are selected. For example, the minimum value (min) and the maximum value (max) are selected as the representative values, and data that retains the two values is set to be a palette. Further, a value of the luminance Y that internally divides a line segment between the minimum value and the maximum value in a 1:2 ratio and a value of the luminance Y that internally divides the line segment in a 2:1 ratio are set to be a first intermediate value (mid1) and a second intermediate value (mid2) on the axis of the luminance Y, respectively. Then data that retains, for each pixel, information specifying any one among the minimum value, the first intermediate value, the second intermediate value, and the maximum value is set to be an index.

For example, with respect to a single coding unit 258 of the Y image sequence 254, a palette is data of 2 bytes, which is 8 bits (representing the luminance Y)×2 values, and an index is data of 4 bytes, which is 2 bits (for information that indicates identification numbers of the four values by 0 through 3)×16 pixels. As described above, the Y image sequence 254, which is one processing unit, is composed of 32 coding units. Thus, the entire Y image sequence 254 represents data of a palette of 32×2 bytes=64 bytes and an index of 32×4 bytes=128 bytes.

Figure 14:
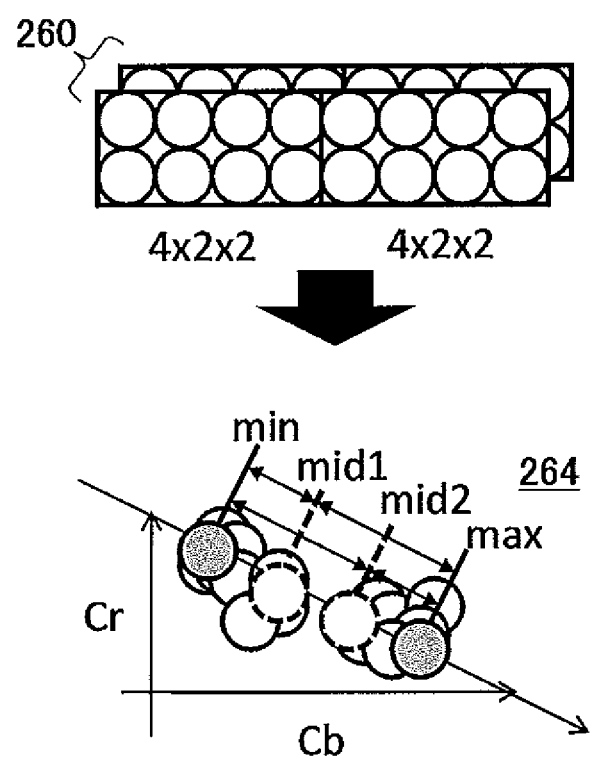
FIG. 14 is a diagram schematically illustrating a method for generating data of a palette and an index from a coding unit of a CbCr image sequence in the present embodiment.

FIG. 14 schematically illustrates a method for generating data of a palette and an index from a coding unit 260 of the CbCr image sequence 256. When division is performed using a pattern shown in FIG. 12, Cb images and Cr images each include 4×2×2=16 pixels in the coding unit 260. A distribution 264 is obtained when sample values of chrominance having (chrominance Cb, chrominance Cr) as components thereof, which corresponding pixels of the both images have as pixel values, are shown on a two-dimensional plane having an axis of the chrominance Cb and an axis of chrominance Cr.

Out of sixteen samples plotted in the distribution 264, two representative values are selected. For example, when the distribution 264 is approximated by a straight line, the chrominance at the left end and the chrominance at the right end of the straight line are set to be the minimum value (min) and the maximum value (max), respectively. Data that retains the two values is set to be a palette. The representative values are two-dimensional parameters having (chrominance Cb,chrominance Cr) as components thereof. Further chrominance that internally divides a line segment between the minimum value and the maximum value in a 1:2 ratio and chrominance that internally divides the line segment in a 2:1 ratio are set to be a first intermediate value (mid1) and a second intermediate value (mid2) on the approximate straight line, respectively. Then data that retains, for each pixel, information specifying any one among the minimum value, the first intermediate value, the second intermediate value, and the maximum value is set to be an index.

For example, with respect to a single coding unit 260 of the CbCr image sequence 256, a palette is data of 4 bytes, which is 2 components (the chrominance Cb and the chrominance Cr)×8 bits (for showing each item of chrominance)×2 values, and an index is data of 4 bytes, which is 2 bits (for information that indicates identification numbers of the four values by 0 through 3)×16 pixels. As described above, the CbCr image sequence 256, which is one processing unit, is composed of eight coding units. Thus, the entire CbCr image sequence 256 represents data of a palette of 8×4 bytes=32 bytes and an index of 8×4 bytes=32 bytes.

When compression is conducted as described, an RGB image of 8 pixels×8 pixels×8 frames, which is one processing unit, will be 256 bytes. 256 bytes is the total of 64 bytes of a palette and 128 bytes of an index of a Y image sequence and 32 bytes of a palette and 32 bytes of an index of a CbCr image sequence. In other words, data for one pixel is 0.5 bytes.

When an RGB image of four pixels by four pixels is compressed using S3TC, a palette will be data of 4 bytes, which is 2 bytes (for showing an RGB value)×2 values, and an index is data of 4 bytes, which is 2 bits (for information that indicates identification numbers of the four values of RGB values by 0 through 3)×16 pixels. Thus, data for one pixel obtained after the compression is 8 bytes/16 pixels=0.5 bytes, which is the same as the data size obtained after the compression by the above-stated compression method. Therefore, by compressing moving image data in such processing units, a still image and a moving image can be treated equally in terms of a unit of data loaded from the hard disk drive 50 into the main memory 60, the size of a cache line within the main memory 60, and the like.

In the present embodiment, a palette and an index are generated after separating an RGB image into a Y image having a one-dimensional parameter and a CbCr image having a two-dimensional parameter. Therefore, in the case of a one-dimensional Y image, all sample values are distributed on a straight line. In the case of a two-dimensional CbCr image, samples that are off an approximate straight line are only in the direction of a normal line of the approximate straight line. Therefore, in comparison to a commonly-used method of S3TC where an RGB image having a three-dimensional parameter is approximated by a straight line and quantized, quantization error can be reduced.

Figure 15:
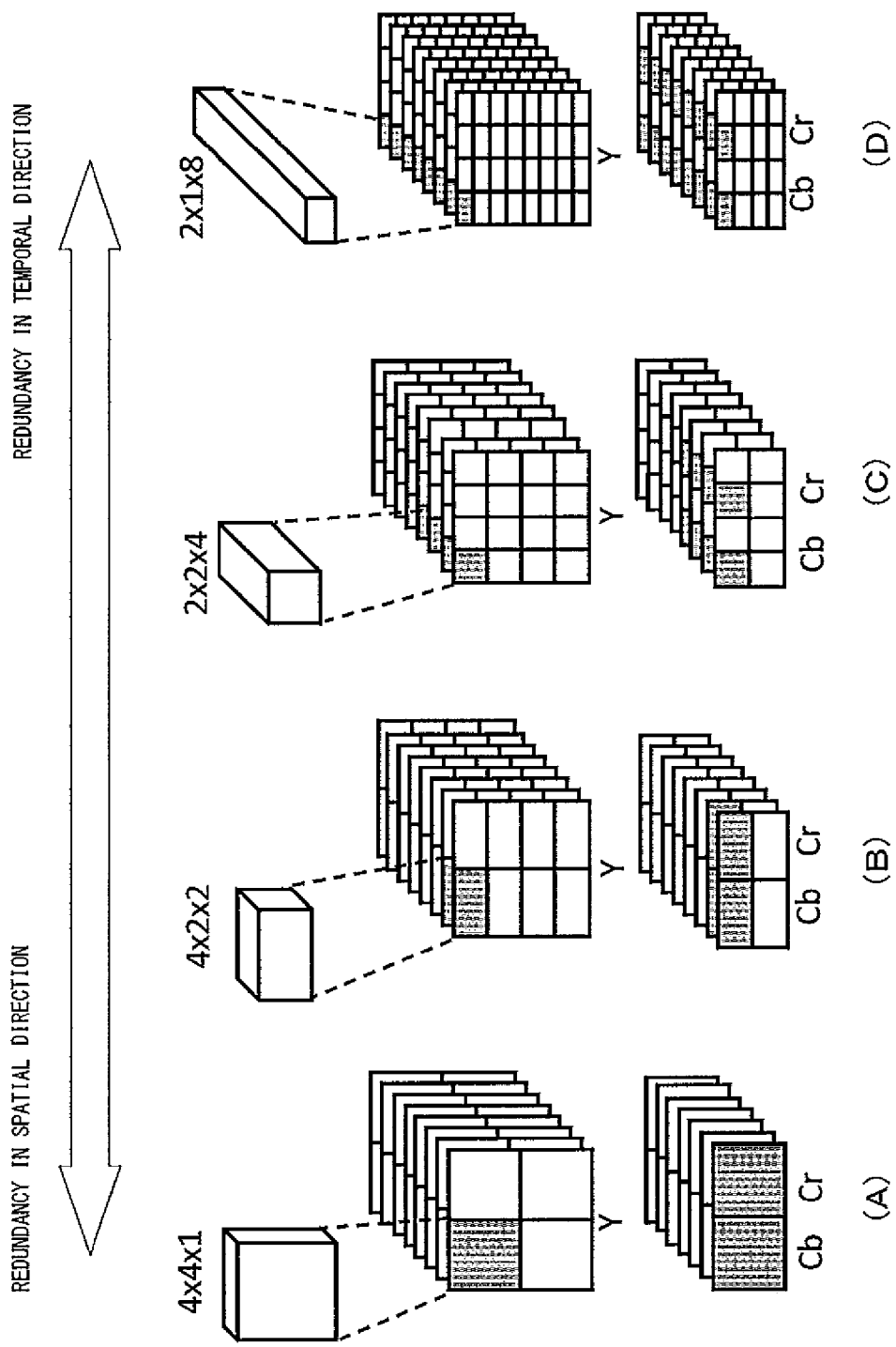
FIG. 15 is a diagram illustrating variation in patterns for dividing one processing unit in the present embodiment.

In a division pattern of FIG. 12, a moving image stream is divided into sets of 4 pixels across×2 pixels down×2 frames, which are then used as coding units. As described above, this division pattern may be changed adaptively according to the contents of an image. FIG. 15 illustrates variation in patterns for separating one processing unit. In the figure, patterns are set to be a pattern (A), a pattern (B), a pattern (C), and a pattern (D) from the left. In both Y image sequences on the top and CbCr image sequences on the bottom, separators for spatial division are shown by straight lines, and one coding unit is representatively shown in shade.

The pattern (A) is a pattern used for division for each one frame of 4 pixels across×4 pixels down. The pattern (B) is a pattern that is the same as the pattern shown in FIG. 12. The pattern (C) is a pattern used for division for every four frames of 2 pixels across×2 pixels down, and the pattern (D) is a pattern used for division for every eight frames of 2 pixels across×1 pixel down.

In any of these patterns, one processing unit is 16 pixels for a Y image sequence and 16 pixels×2 for a CbCr image sequence. Thus, the number of samples handled when performing quantization is the same as those shown in FIG. 13 and FIG. 14. On the other hand, a more detailed temporal division is performed towards the pattern (A) from the pattern (D), and a more detailed spatial division is performed towards the pattern (D) from the pattern (A). Such division patterns are prepared, and a division pattern is selected according to the properties of an image of whether the image has redundancy in a spatial direction or in a temporal direction.

More specifically, if an image has spatial redundancy such as containing a high proportion of areas that are almost of a single color such as sky, grass, etc., the pixel values thereof are more likely to be alike with respect to a space, and error by quantization is unlikely to be included even when the number of spatial divisions is reduced. Thus, a division pattern close to the pattern (A) is selected. On the other hand, if an image has temporal redundancy, for example, when a fixed-point observation of scenery with a little motion is made, the pixel values are likely to be alike in the temporal direction, and error by quantization is unlikely to be included even when the number of temporal divisions is reduced. Thus, a division pattern close to the pattern (D) is selected.

For example, in the case of the pattern (D), one coding unit has only two pixels in the spatial direction. If there is no time variation in eight frames that are included in the same coding unit, two representative values retained in a palette directly represent the original pixel values. Thus, quantization error is zero. When an RGB image is compressed in a method of S3TC, the data of RGB retained in a palette is reduced from the original 24 bits to 16 bits. Thus, there are cases when deterioration in image quality occurs such as a failure of obtaining sufficient gradation when decoded. In the present embodiment, an 8-bit palette is prepared for each of luminance Y, chrominance Cb, and chrominance Cr. Thus, it is highly likely that the original image quality can be kept.

The four types of division patterns, the pattern (A) through the pattern (D), and information for identifying these patterns, for example, four identification numbers of 0, 1, 2, and 3 are stored in advance in the division pattern memory unit 128 in association with each other. The image division unit 122 selects a division pattern with the smallest error against the original image by using all the division patterns, which are stored in the division pattern memory unit 128, for each image sequence generated by the YCbCr conversion unit 120.

Practically, in this process, the compression coding unit 124 performs compression coding of an image sequence occurring when division is performed using each division pattern, and an image obtained by decoding compressed data is compared with an image before the compression for each image frame. Then, a division pattern with small error needs to be selected. The image division unit 122 notifies the compression coding unit 124 of an identification number of a selected division pattern, and the compression coding unit 124 includes information regarding the identification number in compressed data that has been generated and stores the compressed data including the information in the compressed-data memory unit 130 as final compressed data.

Figure 16:
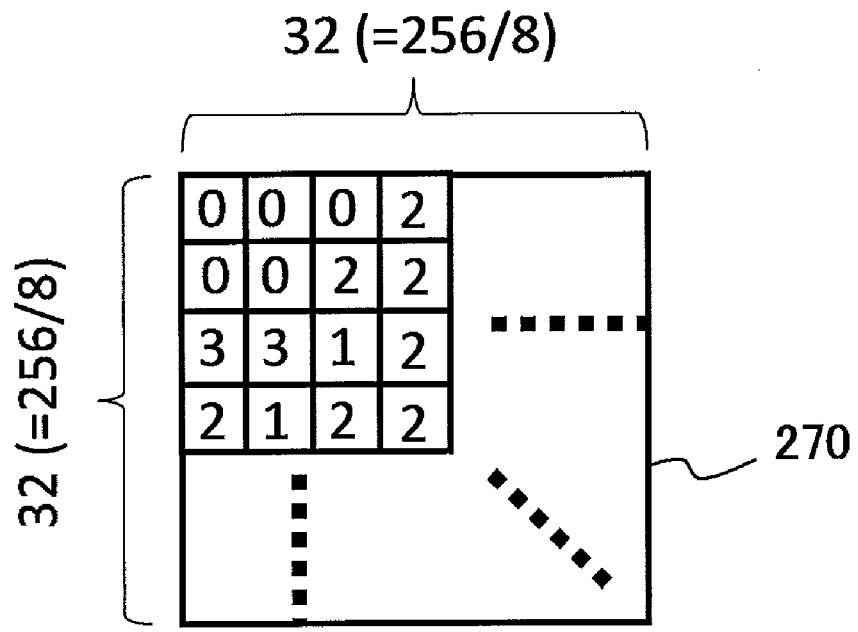
FIG. 16 is a diagram illustrating an example of the data structure of a division pattern map in the present embodiment.

A division pattern may be changed according to an area in an image. A procedure of selecting a division pattern for each area may be the same as the procedure described above. The image division unit 122 then generates a map mapping the identification number of the selected division pattern to an area and includes the map in the final compressed data. FIG. 16 illustrates an example of the data structure of a division pattern map. The example of the figure shows a case where one moving image stream is composed of image frames of 256 pixels×256 pixels. If the four types of division patterns shown in FIG. 15 can be set, the smallest unit for which a division pattern can be set is set to be 8 pixels×8 pixels×8 frames.

When setting a division pattern for each smallest unit, an identification number of a division pattern, i.e., a value of 0 through 3, is mapped to each area of 8 pixels×8 pixels for an image frame of 256 pixels×256 pixels, as shown in FIG. 16. As a result, a division pattern map 270 will contain information of 32×32×2 bits=256 bytes. By adding such a division pattern map 270 for every eight frames, a division pattern can be also changed in the temporal direction.

The example shown in FIG. 16 is a case where a division pattern is set for each smallest unit of 8 pixels×8 pixels. Similarly, a division pattern may be set for each area in which an area of 8 pixels×8 pixels are connected in the vertical direction and in the horizontal direction, e.g., each area of 16 pixels×16 pixels, each area of 64 pixels×32 pixels, and the like. Also, a setting unit itself can be set in various ways. For example, one division pattern is set for the entire area. Instead of the generation of a division pattern map based on the error against the original image by actually decoding compression-coded data as described above, a setting unit and a division pattern to be set for each setting unit may be predetermined by using a test image having similar contents.

An explanation is given of a procedure of storing compression-coded data in the compressed-data storage unit 130 by the compression coding unit 124. Compressed data generated in the present embodiment is composed of a palette and an index similarly to the texture compression method of S3TC. Therefore, a commonly-used GPU shading function included in the control unit 100 of the image processing device 10 of FIG. 4 can be directly used for a decoding process.

Therefore, it is desirable that an index and a palette that are generated by quantizing data of a Y image sequence and an index and a palette that are generated by quantizing data of a CbCr image sequence can be read out and decoded just like a normal texture image. Thus, when storing compressed data, by unifying quantized data of a Y image sequence and quantized data of a CbCr image sequence that represent the same area, pixels can be restored by reduced data access.

Figure 17:
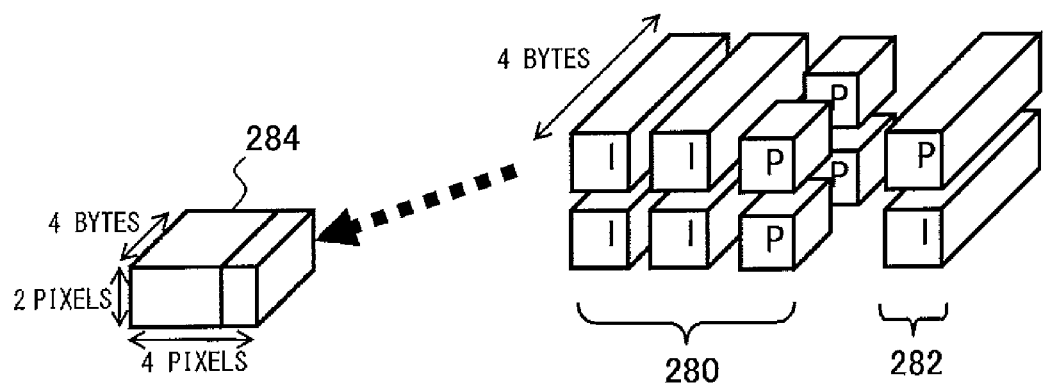
FIG. 17 is a diagram for explaining an array of compressed data in a compressed-data memory unit in the present embodiment.

FIG. 17 is a diagram for explaining an array of compressed data in a compressed-data memory unit 130. As described above, in order to treat data quantized after separation into a Y image sequence and a CbCr image sequence equally to compressed data of an RGB image, it is desirable to collectively store these items of data, which represent the same area. In the present embodiment, compressed data 280 for a Y image sequence and compressed data 282 for a CbCr image sequence, which represents the same area, are put together as a single storage unit.

In the figure, each cuboid denoted by "I" of the compressed data 280 for a Y image sequence represents an index generated in one coding unit, and each cuboid denoted by "P" represents a palette generated in one coding unit. The same applies to the compressed data 282 for a CbCr image sequence. As described above, an index and a palette of a Y image sequence are data of 4 bytes and data of 2 bytes, respectively, for a single coding unit. An index and a palette of a CbCr image sequence are both data of 4 bytes for a single coding unit.

As shown in FIG. 17, data for four coding units of a Y image sequence and data for one coding unit of a CbCr image sequence that represent the same area are arranged and put together in a memory area having a depth of 4 bytes. In this case, since each palette of the compressed data for the Y image sequence represents data of 2 bytes, arranging two palettes for Y images in the depth direction as shown in the figure allows the data in the memory area to be data of 2 down×4 across×4 bytes. A Y image sequence and a CbCr image sequence that represent the same area in this case are, for example, image blocks "A", "B", "C", and "D" of a Y image, an image block "I" of a Cb image, and an image block "K" of a Cr image in FIG. 12.

By putting the compressed data together as described above, the data can be directly stored in a memory area 284 for storing data of an RGBA image of 2 pixels down×4 pixels across. As described above, since 32 coding units and 8 coding units are formed for the Y image sequence and the CbCr image sequence, respectively, for a processing unit of 8 pixels×8 pixels×8 frames, eight items of such a storage unit are formed for a single processing unit. Since one storage unit has the same data size as that of an RGBA image of 2 pixels down×4 pixels across, one processing unit represents data of an RGBA image of 8 pixels×8 pixels. The same feature applies to any division pattern shown in FIG. 15.

Figure 18:
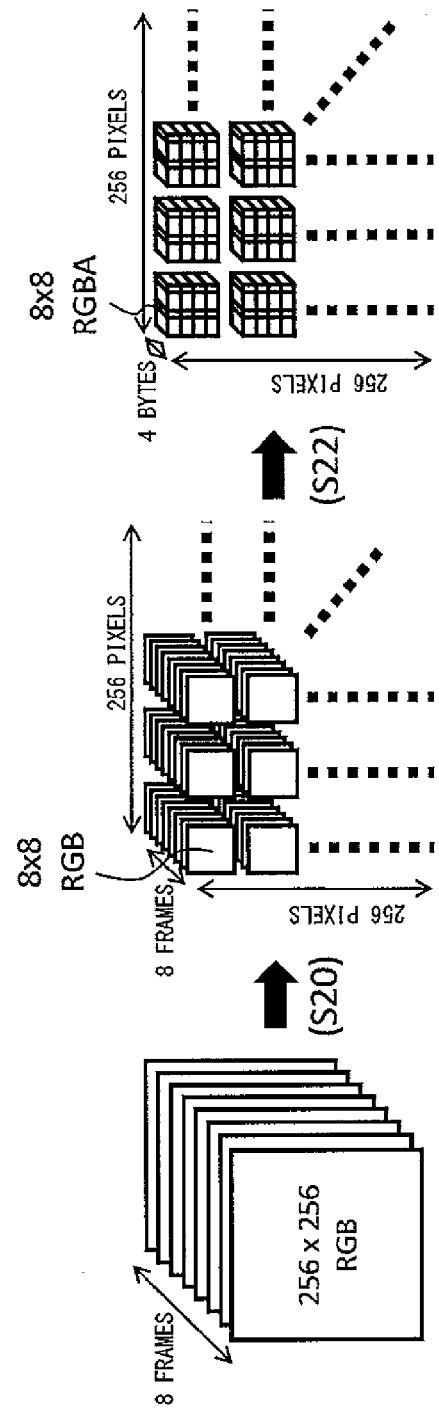
FIG. 18 is a diagram schematically illustrating a data transition when a compression coding process is performed on the entire moving image stream in the present embodiment.

FIG. 18 schematically illustrates a data transition when a compression coding process described thus far is performed on the entire moving image stream. It is assumed that a moving image stream is composed of image frames of an RGB image of 256 pixels×256 pixels and that the moving image stream is compressed in units of eight frames. First, eight image frames are divided into processing units of 8 pixels×8 pixels (S20). This allows 32 processing units to be formed each in the vertical direction and in the horizontal direction.

Then, for each processing unit, a Y image and a reduced CbCr image are generated by performing YCbCr conversion, and an index and a palette are generated after dividing the images into coding units as shown in FIG. 12. These coding units are put together to form eight storage units for one processing unit (S22). As a result, an RGB image of eight frames is compressed to a data size of an RGBA image of one frame that has the same number of pixels.

An explanation is now given regarding a method for embedding a division pattern map in compressed data that is described above. As shown in FIG. 17, four palettes of a Y image sequence are stored in one storage unit. Two values, which are representative values of luminance Y, are stored in each palette. By using two palettes arranged in line in the depth direction among four palettes included in one storage unit, information of 2 bits used for identifying four division patterns is embedded.

Figure 19:
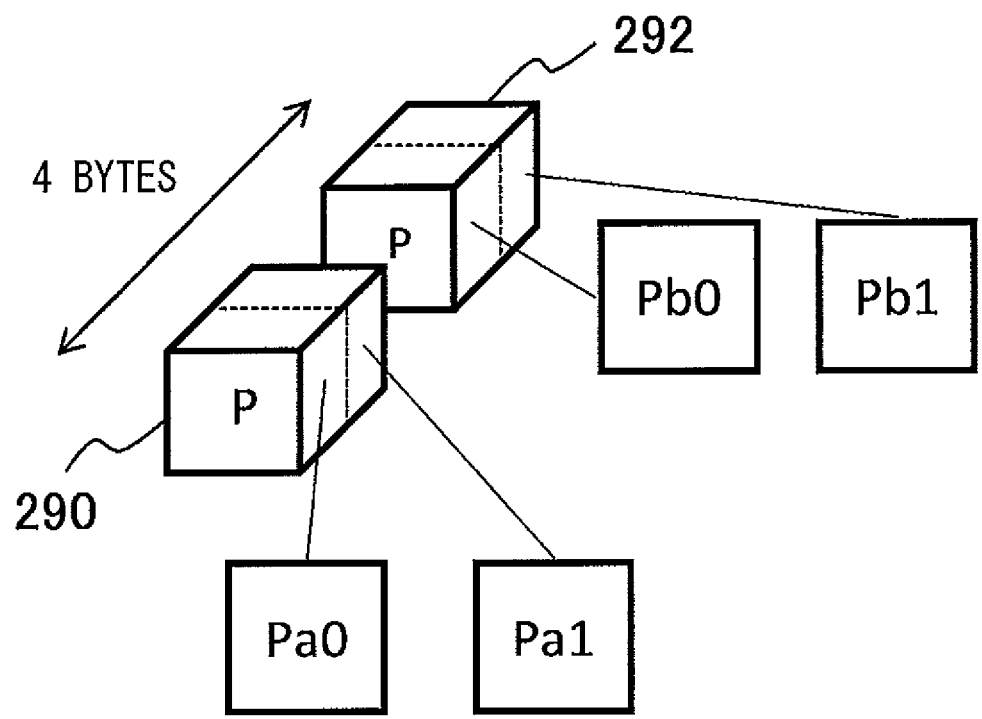
FIG. 19 is a diagram for explaining a method for embedding an identification number of a division pattern in two palettes in the present embodiment.

FIG. 19 is a diagram for explaining a method for embedding an identification number of a division pattern in the two palettes. It is assumed that two values retained by a first palette 290 out of the two palettes are "Pa0" and "Pa1" in order from an initial address on the near side of the figure and that two values retained by a second palette 292 are "Pb0" and "Pb1" in order of an address. Information of a total of 2 bits is expressed according to a magnitude relationship between "Pa0" and "Pa1" and a magnitude relationship between "Pb0" and "Pb1".

For example, information of 1 bit is expressed by setting an identification number to be "1" if "Pa0" of the first palette 290 is larger than "Pa1" and "0" otherwise. Similarly, information of 1 bit is expressed by setting an identification number to be "1" if "Pb0" of the second palette 292 is larger than "Pb1" and "0" otherwise. Regardless of which one of two values retained by a palette is stored in an initial address, there is no effect on a decoding process. Thus, by changing which address a larger value is to be stored in each palette according to an identification number of a division pattern, the identification number of the division pattern can be embedded in the palette.

With this, a division pattern map can be included in compressed data without generating the division pattern map separately from the compressed data itself, and the data size can thus be reduced as a whole. Also, since an identification number is embedded for each compressed data of a corresponding area, efficiency at the time of reference is high. As described above, since a division pattern is set for one processing unit (=eight storage units) at minimum, one division pattern may be embedded in any pair of palettes in the eight storage units. On the other hand, the same division pattern may be embedded for all 16 pairs of palettes included in the eight storage units.

When decoding such compressed data in which a division pattern is embedded, a palette of a Y image sequence in which the division pattern is embedded is first read out for each processing unit, and the identification number of the division pattern set for the processing unit is identified. With this, the relationship between a pixel and respective storage locations of an index and a palette that include data necessary for rendering the pixel can be induced. In accordance with this, an index and a palette of a Y image sequence and an index and a palette of a CbCr image sequence that correspond to a pixel to be rendered are read out and decoded.

A decoding process can be basically performed just as in the case of S3TC. In other words, from representative values retained by each palette, intermediate values for the interpolation of the values are generated, and the representative values or the intermediate values are set to be pixel values of respective pixels in accordance with specification by an index. On the other hand, since a palette and an index are generated for each coding unit in the present embodiment, a Y image sequence and a CbCr image sequence are restored by reconstructing an array of pixels with determined pixel values in the spatial direction and the temporal direction based on an array of coding units in an image sequence corresponding to a division pattern. Then, by generating a Cb image and a Cr image by enlarging the restored CbCr image, a YCbCr image corresponding to the original image frame can be obtained.

According to the present embodiment described above, hierarchical data in which a plurality of moving image streams expressing image frames that constitute a moving image in different resolution is generated, and the moving image is displayed while moving a display area according to a request for moving a viewpoint from the user. For a prevailing high-definition moving image or even more higher-definition moving image, by switching layers of data used for frame rendering according to a desired scale, a request such as an enlargement request for the purpose of checking the details or a reduction request for the purpose of viewing the whole can be sequentially accepted, and the images can be displayed with good responsiveness.

Moving image streams that constitute each layer of hierarchical data are set to be composed of image frames of the same size in any layer. As a result, the higher the resolution of a layer becomes, the number of moving image streams that constitute one layer becomes increased. By setting image frames to have the same size as described, processes such as loading, decoding, and the like at the time of displaying can be uniformized regardless of a layer, and an efficient rendering process suitable for the locality of a display target area can be also performed.

Also, by constituting one image by a plurality of moving image streams, adjustment such as changing a frame rate for each moving image stream, replacing a part of area with a still image, and the like can be performed in view of spatial locality of the image. In an image of a layer of given resolution, if there is an area that can be substituted by enlarging an image of a low-resolution layer, the moving image stream itself in charge of the area can be eliminated from data.

Instead of constituting the entire moving image by a single item of hierarchical data, the moving image may be divided on a time axis and constituted by a plurality of items of hierarchical data. Alternatively, a single item of moving image compressed data may be generated from each of the entire moving image streams of each layer included in a single item of hierarchical data, or may be individually generated for a predetermined number of image frames. By allowing the number of items of hierarchical data, the data structure of a moving image stream in the hierarchical data, and the compression coding format to be selected appropriately according to the contents of a moving image, reproduction time, and the like, the most suitable display mode can be achieved from multiple points of view such as a processing load at the time of displaying the moving image, desired image quality, etc.

Further, in the present embodiment, a moving image stream is compression coded for a predetermined number of image frames. At this time, an image represented by luminance Y, and image represented by chrominance Cb, and represented by chrominance Cr are generated that represent an RGB image of an image frame constituting the original moving stream. After reducing the Cb image and the Cr image, each image sequence is divided for a predetermined size and a predetermined number of image frames so as to generate a coding unit. After that, data of a palette and an index is generated for each of a Y image sequence and a CbCr image sequence. A palette represents data of two values representing representative values of each image, and an index represents data that specifies, in units of pixels, any one value among intermediate values obtained by linear interpolation of the representative values and the representative values.

Although the concept of a palette and an index is introduced in a compression method of S3TC for an RGB image of texture, since two values of a palette retain data of eight bits for each of luminance Y, chrominance Cb, and chrominance Cr, image quality is not likely to be deteriorated in the present embodiment. Since quantization is performed separately for a Y image sequence and a CbCr image sequence, the number of dimensions of a parameter is smaller, and there is less quantization error compared to quantization of three-dimensional parameter of RGB. Also, by changing a combination of the number of spatial divisions and the number of temporal divisions at the time of forming a coding unit, a data structure can be flexibly provided that adapts to the redundancy in the spatial direction and the redundancy in the temporal direction of an image.

By using the above-stated compression method, a rendering process can be performed in the same way as a texture mapping process by a GPU. Thus, high throughput can be expected that is applicable to moving image data of a hierarchical structure according to the present embodiment such as reading out a moving image stream of a display area and rendering an image at a predetermined frame rate while switching layers. In comparison to an existing compression coding method, for example, a decoding processing load is more likely to be increased depending on the contents of an image when decoding is performed for each image frame using JPEG. Since decoding of an I picture is necessary for each of a plurality of moving image streams in MPEG, there arises a problem that a processing load is likely to be increased and that latency is likely to be caused for random access in the temporal direction when I pictures are reduced, as a result.

In a compression coding technique in the present embodiment, high-speed rendering can be possible by achieving decoding in a GPU in comparison to the above-stated existing technique. As a result, a high-definition moving image can be displayed while reducing a processing load in a CPU. Thus, additional processes can be further performed in the CPU, and a risk for dropping frames, and the like can be reduced even in a device with inferior processing performance of a CPU such as a mobile terminal, etc. It can be said that this feature matches the future technological trend where, with the spread of solid state drives (SSDs) and the like, the speed of data readout from a memory device is increased while a decoding process is likely to be a bottleneck.

As a result, since the compression coding technology allows for high-throughput rendering while maintaining image quality and further allows for temporal and spatial random access with low latency, a more effective moving image display technology can be realized by applying the compression coding technology in moving image data of a hierarchical structure that is used for the display of a high-definition moving image while changing a display area.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

What is claimed is:

1. A data compression device comprising:
   a data division unit configured to form a plurality of coding units by dividing, in three dimensions, a data sequence subject to compression in a three-dimensional parameter space; and
   a compression coding unit configured to generate, for each of the plurality of coding units: (i) a palette defined by two representative values, and (ii) a plurality of indices, each index representing a respective original data point as a value, determined by linear interpolation, to be one of, or an intermediate value between, the representative values, wherein
   the palette and the plurality of indices for each of the coding units are set as compressed data,
   the data sequence has at least one frame of data at each of a plurality of discrete times,
   each frame of data includes a plurality of discrete data points representing two of the three dimensions, and the discrete time represents a third of the three dimensions, of the three-dimensional parameter space,
   each coding unit includes: (i) a respective set of data points from among one or more sets of the discrete data points of the at least one frame at a first of the discrete times, and (ii) a respective corresponding set of data points from among one or more corresponding sets of the discrete data points of the at least one frame at a second of the discrete times, and
   a predetermined pattern of the coding units defines respective two dimensional positions of: (i) the one or more sets of the discrete data points, and (ii) the one or more corresponding sets of the discrete data points.

2. The data compression device of claim 1, wherein the compression coding unit is configured to define the palette of each of the plurality of coding units by respective minimum and maximum values taken from the data points of such coding unit.

3. The data compression device according to claim 1, wherein:
   the data division unit is configured to form respective sets of coding units according to each of a plurality of predetermined patterns,
   the compression coding unit is configured to perform respective separate data compressions of the data sequence using each of the plurality of predetermined patterns, and
   one of the plurality of predetermined patters is selected for performing compression of the data sequence based on comparing resultant errors of the respective separate data compressions and determining a smallest error.

4. The data compression device according to claim 1, further comprising:
   a conversion unit configured to generate, from moving image data, a Y image sequence, a Cb image sequence, and a Cr image sequence, wherein:
   the at least one frame of data at each discrete time includes: (i) a luminance frame Y having a plurality of pixels of luminance data Y, (ii) a chrominance frame Cb having a plurality of pixels of chrominance data Cb, and (iii) a chrominance frame Cr having a plurality of pixels of chrominance data Cr; and
   the data division unit is configured to form coding units from the luminance frames Y, and other coding units from the chrominance frames Cb and the chrominance frames Cr.

5. The data compression device according to claim 4, wherein the data division unit reduces the Cb image sequence and the Cr image sequence by a predetermined scale in a direction of an image plane before division and performs temporal and spatial division such that a number of pixels included in each coding unit is constant in the Y image sequence, the Cb image sequence, and the Cr image sequence.

6. The data compression device according to claim 4, wherein the moving image data is a moving image stream which constitutes hierarchical moving image data obtained by hierarchizing, in order of resolution, a plurality of image frame sequences that represent image frames constituting a single moving image in different resolutions, and which is generated in units of tile images obtained by dividing each image frame of an image frame sequence of each hierarchical layer by a predetermined size.

7. The data compression device according to claim 1, wherein the compression coding unit generates a storage unit in which the palette and the indices generated for each coding unit are combined in an original three-dimensional parameter space and stores, as compressed data, the palette and the indices in a memory device for each respective storage unit.

8. The data compression device according to claim 1,
wherein the data division unit selects a division pattern for each area of a predetermined unit in the three-dimensional parameter space and generates a division pattern mapping identification information of the selected division pattern to the area of a predetermined unit, and
wherein the compression coding unit generates the palette and the indices for each coding unit generated by the selected division pattern and then includes the division pattern map in the compressed data.

9. The data compression device according to claim 8, wherein the compression coding unit embeds, by expressing the identification information of the division pattern by a magnitude relationship of the two values retained by the palette and by the storage order of the two values, the division pattern map in the palette generated for each coding unit.

10. A data compression method, comprising:
reading out a data sequence representative of a three-dimensional parameter space from a memory device;
forming a plurality of coding units by dividing, in three dimensions, the data sequence subject;
generating, for each of the plurality of coding units: (i) a palette defined by two representative values, and (ii) a plurality of indices, each index representing a respective original data point as a value, determined by linear interpolation, to be one of, or an intermediate value between, the representative values; and
setting the palette and the plurality of indices for each of the coding units as compressed data, wherein:
the data sequence has at least one frame of data at each of a plurality of discrete times,
each frame of data includes a plurality of discrete data points representing two of the three dimensions, and the discrete time represents a third of the three dimensions, of the three-dimensional parameter space,
each coding unit includes: (i) a respective set of data points from among one or more sets of the discrete data points of the at least one frame at a first of the discrete times, and (ii) a respective corresponding set of data points from among one or more corresponding sets of the discrete data points of the at least one frame at a second of the discrete times, and
a predetermined pattern of the coding units defines respective two dimensional positions of: (i) the one or more sets of the discrete data points, and (ii) the one or more corresponding sets of the discrete data points.

11. A non-transitory, computer readable storage medium containing a computer program, which when executed by a computer system causes the system to carry out actions, comprising:
reading out a data sequence representative of a three-dimensional parameter space from a memory device;
forming a plurality of coding units by dividing, in three dimensions, the data sequence subject;
generating, for each of the plurality of coding units: (i) a palette defined by two representative values, and (ii) a plurality of indices, each index representing a respective original data point as a value, determined by linear interpolation, to be one of, or an intermediate value between, the representative values; and
setting the palette and the plurality of indices for each of the coding units as compressed data, wherein:
the data sequence has at least one frame of data at each of a plurality of discrete times,
each frame of data includes a plurality of discrete data points representing two of the three dimensions, and the discrete time represents a third of the three dimensions, of the three-dimensional parameter space,
each coding unit includes: (i) a respective set of data points from among one or more sets of the discrete data points of the at least one frame at a first of the discrete times, and (ii) a respective corresponding set of data points from among one or more corresponding sets of the discrete data points of the at least one frame at a second of the discrete times, and
a predetermined pattern of the coding units defines respective two dimensional positions of: (i) the one or more sets of the discrete data points, and (ii) the one or more corresponding sets of the discrete data points.

12. A data decoding device comprising:
a compressed data reading unit configured to read out, from a memory device, compressed data for each of a plurality of coding units, where the plurality of coding units were formed by dividing, in three dimensions, a data sequence subject to compression in a three-dimensional parameter space, and where the compressed data include, for each of the plurality of coding units: (i) a palette defined by two representative values, and (ii) a plurality of indices, each index representing a respective original data point as a value, determined by linear interpolation, to be one of, or an intermediate value between, the representative values;
a decoding unit configured to generate the values by linear interpolation of the representative values of the palette, to determine a plurality of data points included in each coding unit in accordance with the values and the indices, and to generate an original data sequence by reconstruction based on an array of the data points; and
an output unit configured to output the generated data sequence, wherein:
the data sequence has at least one frame of data at each of a plurality of discrete times;
each frame of data includes a plurality of discrete data points representing two of the three dimensions, and the discrete time represents a third of the three dimensions, of the three-dimensional parameter space;
each coding unit includes: (i) a respective set of data points from among one or more sets of the discrete data points of the at least one frame at a first of the discrete times, and (ii) a respective corresponding set of data points from among one or more corresponding sets of the discrete data points of the at least one frame at a second of the discrete times; and
a predetermined pattern of the coding units defines respective two dimensional positions of: (i) the one or more sets of the discrete data points, and (ii) the one or more corresponding sets of the discrete data points.

13. The data compression device of claim 12, wherein:
the data sequence represents moving image data, including a Y image sequence, a Cb image sequence, and a Cr image sequence, wherein:

the at least one frame of data at each discrete time includes: (i) a luminance frame Y having a plurality of pixels of luminance data Y, (ii) a chrominance frame Cb having a plurality of pixels of chrominance data Cb, and (iii) a chrominance frame Cr having a plurality of pixels of chrominance data Cr; and the coding units are formed from the luminance frames Y, and other coding units are formed from the chrominance frames Cb and the chrominance frames Cr.

14. The data decoding device according to claim 13, wherein:

the decoding unit is configured to generate data of the Y image sequence, the Cb image sequence, and the Cr image sequence by reconstructing the pixels of luminance data Y, the pixels of chrominance data Cb, and the pixels of chrominance data Cr, based on the array of the data points, and the output unit outputs, to a display device, data of a YCbCr image sequence representing the image frame sequence based on data of the Y image sequence, the Cb image sequence, and the Cr image sequence.

15. The data decoding device according to claim 12, wherein the compressed data further includes a division pattern map that retains information for identifying a three-dimensionally division pattern for each predetermined area unit in the three-dimensional parameter space, and wherein the decoding unit identifies the array of the coding unit by a division pattern indicated by the division pattern map and reconstructs an original array of data based on the array of the coding unit.

16. The data decoding device according to claim 12, wherein the compressed data is stored in a memory device for each storage unit in which the palette and the index generated for each coding unit are put together in units of predetermined areas in an original three-dimensional parameter space, and wherein the compressed data reading unit identifies the storage unit for respective areas to be decoded and the reads out a palette and an index included in the storage unit.

17. A data decoding method, comprising:

reading out, from a memory device, compressed data for each of a plurality of coding units, where the plurality of coding units were formed by dividing, in three dimensions, a data sequence subject to compression in a three-dimensional parameter space, and where the compressed data include, for each of the plurality of coding units: (i) a palette defined by two representative values, and (ii) a plurality of indices, each index representing a respective original data point as a value, determined by linear interpolation, to be one of, or an intermediate value between, the representative values;

generating the values by linear interpolation of the representative values of the palette, to determine a plurality of data points included in each coding unit in accordance with the values and the indices, and to generate an original data sequence by reconstruction based on an array of the data points; and outputting the generated data sequence, wherein:

the data sequence has at least one frame of data at each of a plurality of discrete times;

each frame of data includes a plurality of discrete data points representing two of the three dimensions, and the discrete time represents a third of the three dimensions, of the three-dimensional parameter space;

each coding unit includes: (i) a respective set of data points from among one or more sets of the discrete data points of the at least one frame at a first of the discrete times, and (ii) a respective corresponding set of data points from among one or more corresponding sets of the discrete data points of the at least one frame at a second of the discrete times; and a predetermined pattern of the coding units defines respective two dimensional positions of: (i) the one or more sets of the discrete data points, and (ii) the one or more corresponding sets of the discrete data points.

18. A non-transitory, computer readable storage medium containing a computer program, which when executed by a computer system causes the system to carry out actions, comprising:

reading out, from a memory device, compressed data for each of a plurality of coding units, where the plurality of coding units were formed by dividing, in three dimensions, a data sequence subject to compression in a three-dimensional parameter space, and where the compressed data include, for each of the plurality of coding units: (i) a palette defined by two representative values, and (ii) a plurality of indices, each index representing a respective original data point as a value, determined by linear interpolation, to be one of, or an intermediate value between, the representative values;

generating the values by linear interpolation of the representative values of the palette, to determine a plurality of data points included in each coding unit in accordance with the values and the indices, and to generate an original data sequence by reconstruction based on an array of the data points; and outputting the generated data sequence, wherein:

the data sequence has at least one frame of data at each of a plurality of discrete times;

each frame of data includes a plurality of discrete data points representing two of the three dimensions, and the discrete time represents a third of the three dimensions, of the three-dimensional parameter space;

each coding unit includes: (i) a respective set of data points from among one or more sets of the discrete data points of the at least one frame at a first of the discrete times, and (ii) a respective corresponding set of data points from among one or more corresponding sets of the discrete data points of the at least one frame at a second of the discrete times; and a predetermined pattern of the coding units defines respective two dimensional positions of: (i) the one or more sets of the discrete data points, and (ii) the one or more corresponding sets of the discrete data points.

* * * * *